(12) United States Patent
Iizuka

(10) Patent No.: US 8,614,937 B2
(45) Date of Patent: Dec. 24, 2013

(54) OPTICAL INFORMATION RECORDING DEVICE AND METHOD

(75) Inventor: Junya Iizuka, Chigasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 815 days.

(21) Appl. No.: 12/680,616

(22) PCT Filed: Aug. 5, 2008

(86) PCT No.: PCT/JP2008/064027
§ 371 (c)(1),
(2), (4) Date: Mar. 29, 2010

(87) PCT Pub. No.: WO2009/044586
PCT Pub. Date: Apr. 9, 2009

(65) Prior Publication Data
US 2010/0208562 A1      Aug. 19, 2010

(30) Foreign Application Priority Data

Oct. 1, 2007   (JP) .................................. 2007-257897

(51) Int. Cl.
*G11B 7/00*        (2006.01)
*G11B 11/00*       (2006.01)

(52) U.S. Cl.
USPC ........................................ 369/103; 369/53.35

(58) Field of Classification Search
USPC .................................. 369/103, 112.1, 112.15
See application file for complete search history.

(56) References Cited

U.S. PATENT DOCUMENTS

| 5,812,288 | A |  | 9/1998 | Curtis |
| 2004/0223200 | A1 |  | 11/2004 | Waldman |
| 2006/0192866 | A1 |  | 8/2006 | Taguchi |
| 2007/0047039 | A1 |  | 3/2007 | Noguchi |
| 2007/0047042 | A1 | * | 3/2007 | Noguchi ......................... 359/24 |

FOREIGN PATENT DOCUMENTS

| JP | 2004-272268 | 9/2004 |
| JP | 2006-221736 | 8/2006 |
| JP | 2007-065138 | 3/2007 |
| JP | 2007-66375 | 3/2007 |
| JP | 2007-066375 | 3/2007 |
| JP | 2007-066376 | 3/2007 |
| JP | 2007-066377 | 3/2007 |
| WO | WO 2004/102542 A1 | 11/2004 |
| WO | WO 2008/029995 | 3/2008 |

OTHER PUBLICATIONS

Japanese Office Action dated Jul. 2, 2013 for Application No. 2011-190246.

* cited by examiner

*Primary Examiner* — Joseph Haley
*Assistant Examiner* — Carl Adams
(74) *Attorney, Agent, or Firm* — Antonelli, Terry, Stout & Kraus, LLP.

(57) ABSTRACT

In an optical information recording device and optical information recording method for angularly multiplexing and recording data on pages on the same recording region on a hologram disk, data on each page is sequentially generated by sequentially dividing input data in predetermined units, the pages to be recorded on the same recording region are divided into page groups so that pages to be recorded adjacently by the angular multiplexing may not belong to the same group, each page group is individually subjected to inter-page coding processing for computing an error-correcting code and adding the computed error-correcting code, and data on the pages subjected to the inter-page coding processing is angularly multiplexed and recorded on the hologram disk.

8 Claims, 19 Drawing Sheets

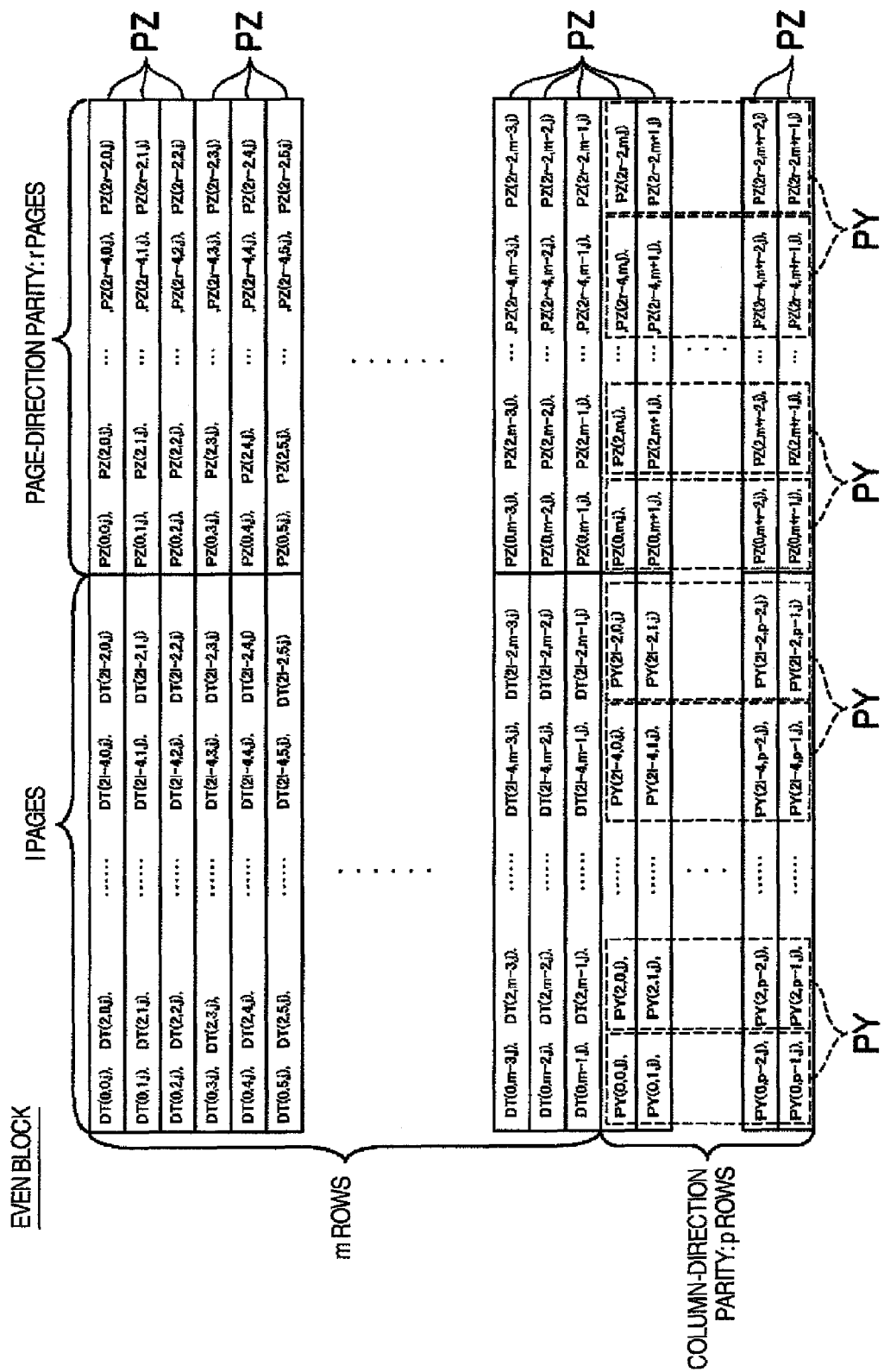

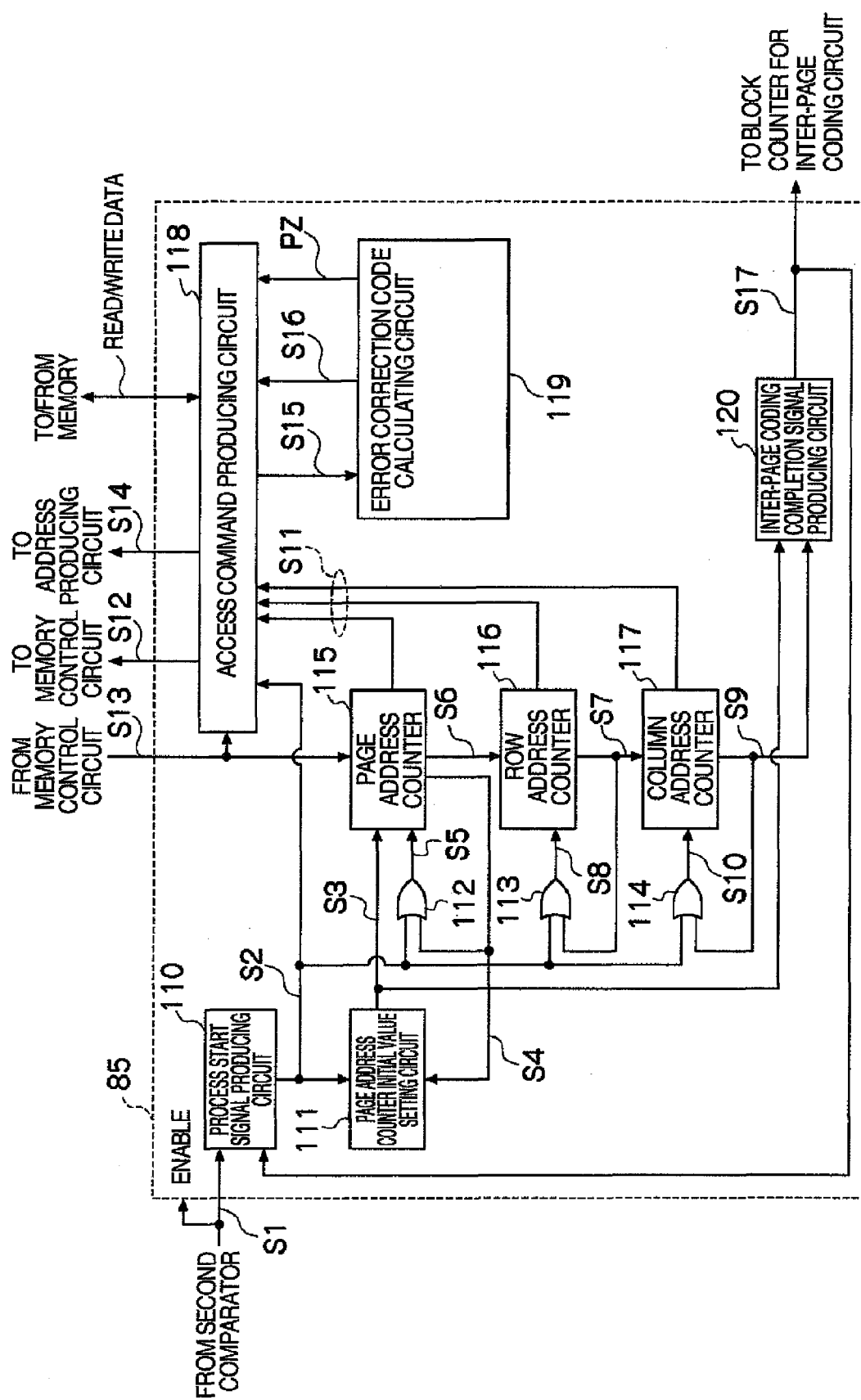

OPTICAL INFORMATION RECORDING DEVICE AND METHOD

INCORPORATION BY REFERENCE

The present invention claims priority from Japanese patent application JP 2007-257897 filed on Oct. 1, 2007, the content of which is hereby incorporated by reference into this application.

TECHNICAL FIELD

The present invention is related to an device for recording information on an optical information recording medium and/or for reproducing information from the optical information recording medium by employing holography.

BACKGROUND ART

Conventionally, there are optical information recording/reproducing devices which record information on information recording regions (information recording planes) of optical information recording media (optical disks) of reflection systems such as CDs (Compact Disks) and DVDs (Digital Versatile Disks), and/or reproduce the information recorded on the information recording regions.

Also, in recent years, reflection-system disks having recording density of approximately 50 GB have been commercially available even in consumer fields based upon the Blu-ray Disk (will be referred to as "BD" hereinafter) standard using blue-purple semiconductor lasers, the HD DVD (High Definition DVD) standard, and the like. On the other hand, as to optical disks, larger storage capacities have been expected which are comparable with storage capacities (100 GB to 1 TB) of HDDs (Hard Disk Drives).

However, in order to realize such ultra-high density with employment of optical disks, novel storage technologies are required, while the novel storage technologies are different from the conventional high density technologies by which wavelengths of optical elements are shortened and NAs of objective lenses are increased. As a consequence, in recent years, an attention has been paid to hologram recording technologies for recording digital information by utilizing the holography. In accordance with the hologram recording technologies, two-dimensional information can be simultaneously recorded/reproduced by a single hologram. Also, a plurality of page data can be overwritten in the same place. As a result, the above-described hologram recording techniques are advantageous for a large capacity of information can be recorded and/or reproduced in high speeds.

As such hologram recording technologies, a so-called "angular multiplex recording system" (refer to, for instance, JP-A-2004-272268) has been proposed. In the angular multiplex recording system, signal luminous fluxes are collected by a lens onto a hologram-purpose optical disk (will be referred to as "hologram disk" hereinafter), and at the same time, reference light of collimated luminous fluxes are irradiated so as to be caused to interfere with the signal luminous fluxes in order to perform hologram recording, and moreover, different page data are displayed on a spatial light modulator so as to perform multiplex recording while an incident angle of the reference light with respect to the hologram disk is changed.

Also, another hologram recording technique using a shift multiplexing system (refer to, for example, WO2004-102542) has been proposed. In the shift multiplexing system, while light from pixels of an inner side in a single spatial light modulator is employed as signal light and light from ring belt-shaped pixels of an outer side thereof is employed as reference light, both the luminous fluxes are collected onto a hologram disk by the same lens, and the signal light is caused to interfere with the reference light in the vicinity of a focal plane of the lens so as to record a hologram.

DISCLOSURE OF THE INVENTION

In the case that information is recorded on a hologram disk, while this information is segmented every predetermined unit, two-dimensional information (will be referred to as "page" hereinafter) such as, for example, two-dimensional bar code is sequentially produced based upon the information segmented in the predetermined unit, and data of this page is optically recorded on the hologram disk. Then, in the angular multiplex recording system, the data of such a page is optically recorded on the same place of the hologram disk while an angle is changed.

However, in the case that information is recorded on a hologram disk based upon such an angular multiplex recording system, if an incident angle of reference light with respect to the hologram disk is shifted from a predetermined angle, then the below-mentioned problem occurs. That is, when the above-described page and another page located adjacent to this page along the shift direction, crosstalk produced from the adjoining page is increased, so that reproduction information having superior qualities cannot be obtained. Thus, the larger a total number of pages to be recorded by the angular multiplexing method is increased, the more serious such a problem becomes.

It should be noted that JP-A-2007-65138, JP-A-2007-66376, and JP-A-2007-66377 publications disclose the below-mentioned methods: That is, in the case that the angular multiplex recording system is applied to a hologram disk, when data of respective pages are recorded on the hologram disk with being physically located adjacent to each other, regions called as black guards are provided among regions thereof for recording these pages. Then, in accordance with the above-described methods, it is possible to prevent occurrences of crosstalk among the pages recorded on the hologram disk with being physically located adjacent to each other. However, as previously described, it is not possible to prevent occurrences of crosstalk among the adjacent pages recorded by the angular multiplexing method.

The present invention has been made to solve the above-described problems, and therefore, is to propose an optical information recording device and an optical information recording method, capable of obtaining reproduction information having superior qualities.

In order to solve the above-described problems, an optical information recording device for angle-multiplexing data for a plurality of pages to record the angle-multiplexed data on the same recording region of a hologram disk, according to the present invention, is featured by comprising: a signal producing unit for sequentially dividing input data in a predetermined unit so as to sequentially produce data of respective pages, and for performing an inter-page coding process by which the plurality of pages to be recorded on the same recording region are divided into a plurality of page groups in order that pages which are recorded adjacent to each other by being angle-multiplexed do not belong to the same page group, and an inter-page error correction code is separately calculated for each of the page groups and the calculated inter-page error correction code is added thereto; and an optical pickup for angle-multiplexing the data of the plural pages to which the inter-page coding process has been performed so as to record the angle-multiplexed data on the hologram disk.

Also, an optical information recording method for angle-multiplexing data for a plurality of pages to record the angle-multiplexed data on the same recording region of a hologram disk, according to the present invention, is featured by comprising: a first step for sequentially dividing input data in a predetermined unit so as to sequentially produce data of respective pages, and for performing an inter-page coding process by which the plurality of pages to be recorded on the same recording region are divided into a plurality of page groups in order that pages which are recorded adjacent to each other by being angle-multiplexed do not belong to the same page group, and an inter-page error correction code is separately calculated for each of the page groups and the calculated inter-page error correction code is added thereto; and a second step for angle-multiplexing the data of the plural pages to which the inter-page coding process has been performed so as to record the angle-multiplexed data on the hologram disk.

In accordance with the present invention, the adjoining pages recorded on the same recording region of the hologram disk in the angular multiplexing manner are divided into the separate page groups, and the inter-page error correction codes are calculated. As a result, the error bits are dispersed, so that the correction capability can be improved. As a consequence, the reproduction information having the superior qualities can be obtained.

Other objects, features and advantages of the present invention may become apparent from the below-mentioned descriptions of embodiments of the present invention related to accompanying drawings.

BEST MODE FOR CARRYING OUT THE INVENTION

Referring to drawings, a detailed description is made of an embodiment of the present invention.
(1) Arrangement of Optical Information Recording/Reproducing Device According to Present Embodiment In FIG. 1, reference numeral 1 shows an optical information recording/reproducing device as an entire system, according to the present embodiment. While the optical information recording/reproducing device 1 is equipped with an optical pickup 2, a phase conjugate optical system 3, a disk cure optical system 4, a disk rotation angle detecting-purpose optical system 5, and a rotation motor 6, this optical information recording/reproducing device 1 is arranged in that a mounted hologram disk 7 can be rotated by the rotation motor 6.

The optical pickup 2 projects reference light and signal light to the hologram disk 7 so as to record thereon digital information by utilizing the holography. In this case, an information signal to be recorded has been produced by performing a predetermined signal process (namely, modulating process and adding process of error correction code) in a signal producing circuit 9 with respect to digital information applied from a host appliance (not shown) to a controller 8. An optical beam emitted from a laser light source 20 (refer to FIG. 2, will be discussed later) provided in the optical pickup 2 is modulated in a spatial light modulating manner by a spatial light modulator 29 (refer to FIG. 2) based up this information signal, so that signal light is produced. Irradiation times of the reference light and the signal light, which are irradiated to the hologram disk 7, can be adjusted by controlling open/close times of a shutter 22 (refer to FIG. 2, will be discussed later) by the controller 8 via a shutter control circuit 10.

In the case that information recorded on the hologram disk 7 is reproduced, phase conjugate light of the reference light emitted from the optical pickup 2 is produced by the phase conjugate optical system 3. In this case, the phase conjugate light implies a light wave traveled along an opposite direction, while the same wavefront of input light is maintained. Reproduction light to be reproduced by this phase conjugate light is detected by a photodetector 42 (refer to FIG. 2, will be discussed later) provided in the optical pickup 2. At this time, a reproducing process (demodulating process, error correcting process etc.) is performed in a signal processing circuit 11 with respect to a light detection signal outputted from a photodetector 218. Then, the information having the original format obtained in the above-described manner is outputted by the controller 8 to the host.

In order to execute the above-described recording operation and reproducing operation over one circumference of the hologram disk 7, the hologram disk 7 is rotated by the rotation motor 6. In order that sufficient optical energy is obtained so as to record information on the hologram disk 7 under stable condition, when the information is recorded and reproduced, it is desirable that the hologram disk 7 is under stationary state. As a consequence, in the present embodiment, a stepper motor capable of stably performing rotating-to-standstill operations of the hologram disk 7 is employed as the rotation motor 6.

The disk cure optical system 4 produces optical beams which are employed in both a pre-cure process and a post-cure process of the hologram disk 7. In this case, the pre-cure implies a pre-stage in which when information is recorded on a desirable position of the hologram disk 7, a predetermined optical beam is previously irradiated onto this desirable position before reference light and signal light are irradiated thereto. Also, the post-cure implies a post-stage in which after information has been recorded on a desirable position within the hologram disk 7, a predetermined light beam is irradiated onto the desirable position in order that information cannot be additionally written thereinto.

The disk rotation angle detecting-purpose optical system 5 is employed in order to detect rotation angles of the hologram disk 7. In the case that the hologram disk 7 is adjusted to a predetermined rotation angle, the disk rotation angle detecting-purpose optical system 5 detects signals in response to rotation angles of the hologram disk 7, and then, the rotation angles of the hologram disk 7 are controlled via a disk rotation motor control circuit 12 by the controller 8 with employment of the detected signals.

While the optical pickup 2, the disk cure optical system 4, and the disk rotation angle detecting-purpose optical system 5 contain therein individual light sources, predetermined light source driving currents are supplied from a light source driving circuit 13 to the respective light sources. As a result, the respective light sources can emit optical beams with predetermined light amounts.

Also, while the optical pickup 2, the phase conjugate optical system 3, and the disk cure optical system 4 have been held by mechanisms capable of sliding positions thereof along a radial direction of the hologram disk 7, positional controls of the optical pickup 2, the phase conjugate optical system 3, and the disk cure optical system 4 are carried out via an access control circuit 14. Then, recording and reproducing operations can be carried out based upon the positional controls.

On the other hand, since the recording technologies using the holography are such techniques capable of recording information in ultrahigh density, there is such a trend that, for instance, tolerable errors with respect to inclinations and positional shifts of the hologram disk 7 become very small. As a result, for example, a mechanism for detecting shift amounts of shift factors such as the inclinations and positional shifts of the hologram disk 7, whose tolerable errors are small, may be provided in the optical pickup 2; a servo control-purpose signal may be produced by a servo signal producing circuit 15; and a servo mechanism for correcting the above-described shift amounts via a servo control circuit 16 may be provided in the optical information recording/reproducing device 1. Alternatively, in order to achieve a compactness of the optical information recording/reproducing device 1, as to the optical pickup 2, the phase conjugate optical system 3, the disk cure optical system 4, and the disk rotation angle detecting-purpose optical system 5, either some of these optical system structures or all the optical system structures may be collected with each other for the sake of simple structures.

FIG. 2 shows a concrete structure of the optical pickup 2. In this optical pickup 2, a light beam emitted from a laser light source 20 is entered via a collimate lens 21 to a shutter 22. When the shutter 22 is opened, after the light beam has passed through the shutter 22, a polarization direction of the light beam is controlled by an optical element 23 constituted by, for example, a ½-wavelength plate and the like in such a manner that a light amount ratio of P-polarized light to S-polarized light becomes a desirable ratio, and thereafter, the polarized light beams are entered to a PBS prism 24. A light beam diameter of a light beam penetrated through the PBS prism 24 is expanded by a beam expander 25, and thereafter, is conducted via a phase mask 26, a relay lens 27, and a PBS prism 28 to a spatial light modulator 29. The spatial light modulator 29 modulates the light beam in a spatial light modulating manner based upon an information signal supplied from the signal producing circuit 9 (FIG. 1). Then, as a result, the modulated signal light is entered via a spatial filter 31 between relay lenses 30 to an objective lens 32, and is collected onto the hologram disk 7 by this objective lens 32.

Also, a light beam reflected on the PBS prism 24 is set to a predetermined polarizing direction by a polarizing direction converting element 33 in response to either recording operation or reproducing operation, and thereafter, is entered via mirrors 34 and 35 to a galvanometer mirror 36. Then, reflection light on this galvanometer mirror 36 is entered as reference light via a lens 38 and an objective lens 39 to the hologram disk 7. In this case, while the galvanometer mirror 36 is such a mirror which can be rotated by an actuator 37, an incident angle of the reference light with respect to the hologram disk 7 can be set to a desirable angle by this mirror rotation.

As previously described, since the signal light and the reference light are entered onto the hologram disk 7 in such a manner that the signal light is overlapped with the reference light, an interference fringe pattern is formed within the hologram disk 7, and this pattern is written in an information recording region in order to record information. Also, since an incident angle of a reference light beam entered to the hologram disk 7 can be changed by rotating the galvanometer mirror 36, recording operation by the angular multiplexing manner can be carried out.

In the case that information recorded on the hologram disk 7 is reproduced, only reference light is entered onto the hologram disk 7, and the reference light passed through the hologram disk 7 is reflected by a galvanometer mirror 40 of the phase conjugate optical system 3, so that phase conjugate light thereof is produced. It should be noted that the galvanometer mirror 40 is held by an actuator 41 in a freely rotatable manner. The reproduction light produced by this phase conjugate light is entered via the objective lens 32 and the spatial filter 31 between the relay lenses 30 to the PBS prism 28, and is reflected on this PBS prism 28, and then, is entered to a photodetector 42. Thus, an output of this photodetector 42 is supplied to the signal processing circuit 11 (FIG. 1) so as to be reproduce-processed.

FIG. 3 to FIG. 5 show operation flows of recording/reproducing processes in the optical information recording/reproducing device 1. In this case, more specifically, a description is made of recording/reproducing operations with respect to the hologram disk 7.

FIG. 3 shows a flow of recording/reproducing preparation processes after the hologram disk 7 is inserted to the optical information recording/reproducing device 1 until either a recording preparation or a reproducing preparation is accomplished; FIG. 4 indicates a flow of a recording process from the preparation accomplish situation until information is recorded on the hologram disk 7; and FIG. 5 represents a flow of a reproducing process from the preparation accomplish situation until information recorded on the hologram disk 7 is reproduced.

As shown in FIG. 3, if an optical disk is inserted (SP 1), then the optical information recording/reproducing device 1 performs a disk judgement for judging, for instance, the inserted optical disk corresponds to an optical disk (hologram disk 7) for recording, or reproducing digital information by utilizing the holography (SP 2).

As a result of the disk judgement, when it is judged that the inserted optical disk is the hologram disk 7, the optical information recording/reproducing device 1 reads out control data provided in this hologram disk 7, and acquires, for example, information related to this optical disk, and also, for instance, information related to various sorts of setting conditions during either recording operation or reproducing operation (SP 3).

When the optical information recording/reproducing device 1 has accomplished to read the above-described control data, the optical information recording/reproducing device 1 performs various sorts of adjustments in response to the control data, and a learning process related to the optical pickup 2 (FIG. 1) (SP 4), so that either the recording preparation or the reproducing preparation is accomplished (SP 5).

The operation flow from the preparation accomplish situation until information is recorded is indicated in FIG. 4. In other words, the optical information recording/reproducing device 1 firstly receives data to be recorded, and supplies information responding to the received data to a spatial light modulator 46 (FIG. 2) provided in the optical pickup 2 (SP 10).

Thereafter, the optical information recording/reproducing device 1 performs various sorts of learning processes in advance, if necessary, in order that information having high qualities can be recorded on the hologram disk 7 (SP 11), and while a seek operation and an address reproduction are repeatedly carried out, the optical information recording/reproducing device 1 arranges positions of the optical pickup 2 and the disk cure optical system 4 to predetermined positions of the hologram disk 7 (SP 12 and SP 13).

Next, the optical information recording/reproducing device 1 performs a pre-cure process for pre-curing a predetermined region by employing an optical beam emitted from the disk cure optical system 4 (SP 14), and thereafter, records data by employing reference light and signal light emitted from the optical pickup 2 (SP 15). In this case, in the optical information recording/reproducing device 1 according to the present embodiment, data for a plurality of pages are recorded on a recording region for a 1 page on the hologram disk 7 in accordance with the angular multiplexing recording system.

After the data has been recorded, the optical information recording/reproducing device 1 verifies the data, if necessary (SP 16), and performs a post-cure process for post-curing by employing an optical beam emitted from the disk cure optical system 4 (SP 17).

The operation flow from the preparation accomplish situation until recorded information is reproduced is represented in FIG. 5. In other words, the optical information recording/reproducing device 1 performs various sorts of learning processes in advance, if necessary, in order that information having high qualities can be reproduced from the hologram disk 7 (SP 20). Thereafter, while a seek operation and an address reproduction are repeatedly carried out, the optical information recording/reproducing device 1 arranges positions of the optical pickup 2 and the phase conjugate optical system 3 to predetermined positions of the hologram disk 7 (SP 21 and SP 22).

Thereafter, the optical information recording/reproducing device 1 emits reference light from the optical pickup 2 so as to read out information recorded on the hologram disk 7 (SP 23).

(2) Information Signal Producing Process in Signal Producing Circuit (2-1) Flows of Information Signal Producing Process and Concrete Arrangement of Signal Producing Circuit Next, a description is made of an information signal producing process executed in the above-described signal producing circuit 9 shown in FIG. 1. It is assumed in the below-mentioned descriptions that respective pages to be recorded in a recording region for 1 page on the hologram disk 7 by the angular multiple recording system will be referred to as a "block" in a collection manner. Also, in the present embodiment, it is assumed that such a recording system has been employed. That is, after data for a 1 block have been recorded in a single region on the hologram disk 7 by the angular multiplex recording system, the recording operation is advanced to a next region so as to similarly record data in the next region (will be referred to as "stop and go system" hereinafter).

In the optical information recording/reproducing device 1 according to the present embodiment, as previously described, with respect to the digital information supplied from the host, the signal producing circuit 9 performs such information signal producing processes as an intra-page coding process and an inter-page coding process. As one of the features of the optical information recording/reproducing device 1, when the inter-page coding process is carried out, the inter-page coding process is separately performed every even pages and odd pages.

FIG. 6 shows a flow series of such an information signal producing process executed in the signal producing unit 9. As indicated in FIG. 6, the signal producing unit 9 produces a page (data page) 50D by sequentially dividing input data supplied from the host via the controller 8 based upon a predetermined data unit, and collects a predetermined number of the produced pages 50D so as to sequentially produce a block 51 (SP 30).

Next, since the signal producing unit 9 performs a predetermined intra-page coding process with respect to each of the pages 50D within the block 51 produced in the above-described manner, an intra-page error correction code "PXY" is added to each of these pages 50D (SP 31).

Subsequently, the signal producing unit 9 divides the respective pages 50D within one block 51 into even pages whose page numbers are even and odd pages whose page numbers are odd; and since the signal producing circuit 9 separately performs a predetermined inter-page coding process with respect to an even page group 51E made of the even pages and an odd page group 51O made of the odd pages, a parity page 50P constructed of inter-page error correction code data is added into the even page group 51E and the odd page group 51O (SP 32).

Thereafter, as to the block 51 constituted by the even page group 51E and the odd page group 51O to which the inter-page coding processes have been performed in the above-described manner, the signal producing unit 9 performs a modulating process and an adding process of a synchronous code with respect to each page (data page 50D and parity page 50P) belonging to this block 51 (SP 33), and transfers acquired recording information to the optical pickup 2 (FIG. 1) so as to record the acquired recording information on the hologram disk 7 (SP 34).

FIG. 7 shows a concrete arrangement of the signal producing circuit 9 which performs such a series of information signal producing processes. As apparent also from FIG. 7, the signal producing circuit 9 is arranged by a recording pattern producing unit 60, a recording pattern producing control unit 61, a memory 62, a memory control unit 63, and an address producing circuit 64. The recording pattern producing unit 60 produces recording patterns of respective pages which are recorded on the hologram disk 7. The recording pattern producing control unit 61 controls a producing process for the recording patterns of the respective pages in the recording pattern producing unit 60. The memory 62 is employed by the recording pattern producing unit 61 as a working memory. The memory control unit 63 controls an access to the memory 62. The address producing circuit 64 produces an address of a corresponding position on the memory 62 from positional information of a symbol within a page. It is assumed in the below-mentioned descriptions that 1 page is constructed of "m (longitudinal direction)" pieces of symbols ×"n (lateral direction)" pieces of symbols, and 1 block is arranged by 21 pages.

The recording pattern producing process unit 60 is arranged by a data input processing unit 70, an intra-page coding unit 71, an inter-page coding unit 71, a recording pattern producing unit 72, and a recording pattern transferring unit 73. Input data "D1" supplied from the host via the controller 8 is received by a data input circuit 80 of the data input processing unit 70.

Upon receipt of the input data, the data input circuit 80 sequentially divides this input data into page data made of a total number (m×n) of symbols for a single page, and then, transmits the acquired page data in the unit of 1 symbol via a data bus 75 to the memory 62. In this case, the data input circuit 80 transmits intra-page positional information to the address producing circuit 64, while the intra-page positional information indicates that the page data for 1 symbol being transmitted to the memory 62 at this time corresponds to a symbol of which position (row and column) within the page. Also, every time the data input circuit 80 transmits the page data for 1 symbol in combination with this intra-page positional information to the memory 62, the data input circuit 80 transmits an access request signal to the memory control circuit 63.

When the access request signal is supplied from the data input circuit 80, the memory control circuit 63 transmits an access permission signal to the data input circuit 80 when the data input circuit 80 can access the memory 62, while the access permission signal permits the above-described access. Also, in combination with the access permission signal, the memory control circuit 63 transmits an access permission process selecting signal to the address producing circuit 64, and outputs a write signal to the memory 62, while the access permission process selecting signal permits an access by the data input circuit 80.

Upon receipt of the access permission process selecting signal from the memory control circuit 63, the address producing circuit 64 produces such an address of a storage region within the memory 62, into which the page data for 1 symbol supplied from the data input circuit 80 should be stored based upon the intra-page positional information supplied from the data input circuit 80 at this time, a count value of a page input circuit-purpose page counter 81 supplied from this page input circuit-purpose page counter 81 (as will be discussed later), and a count value of a data input circuit-purpose block counter 82 supplied from the data input circuit-purpose block counter 82 (as will be explained later).

Concretely speaking, in the present embodiment, the storage region of the memory 62 has been divided into a parity adding process-purpose region 62A and a recording pattern storage-purpose region 62B. Also, the parity adding process-purpose region 62A has been divided into a plurality of block storage regions 62AX for temporarily storing data for 1 block, and further, the block storage region 62AX has been divided into a plurality of page storage regions 62AXY for temporarily storing page data of respective pages belonging to the relevant block. In addition, the recording pattern storage-purpose region 62B has been divided into a plurality of recording pattern storage regions 62BX for temporarily holding recording patterns of respective pages within the respective corresponding blocks respectively.

Then, upon receipt of the access permission process selecting signal from the memory control circuit 63, the address producing circuit 64 produces addresses of positions corresponding to positions (rows and columns) indicated by the intra-page positional information supplied from the data input circuit 80 in the page storage region 62AXY corresponding to the count value of the page input circuit-purpose page counter 81 within the block storage region 62AX corresponding to the count value of the data input circuit-purpose block counter 82 in the memory 62. Then, the address producing circuit 64 notifies the produced addresses to the memory 62. As a result, the page data for 1 symbol transferred from the data input circuit 80 to the memory 62 at this time are stored at the address positions notified from the address producing circuit 64 to the memory 62 at this time.

Then, every time the data input circuit 80 transfers the page data for 1 symbol to the memory 62, the data input circuit 80 sequentially moves a position within the page indicated by the intra-page positional information. Concretely speaking, the relevant position is moved one column by one column from a first column of a first row with the page along a row direction; after the relevant position reaches a last column of this row, this position is moved to a first column of a next row; and subsequently, the relevant position is similarly moved up to a last column of a last row within the page. As a result, the page data for 1 page are stored in the corresponding block storage region 62AX as the two-dimensional information made of the m×n pieces of symbols.

On the other hand, when the data input circuit 80 has accomplished to store the page data for 1 page into the memory 62, the data input circuit 80 transmits a page transfer completion signal to a data input circuit-purpose page counter 81.

The data input circuit-purpose page counter 81 is a counter for counting a total number of pages whose data have already been stored in the memory 62. While the data input circuit-purpose page counter 81 increments the count value thereof by "1" every time the page transfer completion signal is supplied from the data input circuit 80, the data input circuit-purpose page counter 81 notifies the present count value to the address producing circuit 64. As a result, the page data of the respective pages are sequentially stored in the different page storage regions 62AXY within the memory 62, which correspond to the count values of the data input circuit-purpose page counter 81, respectively. Then, when the data input circuit-purpose page counter 81 has accomplished to count the total number of pages belonging to 1 block, the data input circuit-purpose page counter 81 transmits a block transfer completion signal to a data input circuit-purpose block counter 82, and thereafter, resets the count value to zero.

The data input circuit-purpose block counter 82 is a counter for counting a total number of blocks which have already been stored in the memory 62. If new input data is applied, then this data input circuit-purpose block counter 82 is reset. Thereafter, while the data input circuit-purpose block counter 82 increments the count value thereof by "1" every time a block transfer completion signal is applied from the data input circuit-purpose page counter 81, the data input circuit-purpose block counter 82 notifies the present count value to the address producing circuit 64. As a result, the data of the respective blocks are sequentially stored in the different block storage regions 62AX within the memory 62, which correspond to the count values of the data input circuit-purpose block counter 82, respectively.

Also, the data input circuit-purpose block counter 82 also notifies the count value to a first comparator 100.

The first comparator 100 compares the count value (corresponding to total number of blocks processed by data input processing circuit 70) of the data input circuit-purpose block counter 82 notified from this data input circuit-purpose block counter 82 with a count value (corresponding to total number of blocks processed by intra-page coding unit 71) of an intra-page coding circuit-purpose block counter 84 (will be discussed later), which is notified from this intra-page coding circuit-purpose block counter 84 of an intra-page coding unit (will be explained later). When the count value of the data input circuit-purpose block counter 82 is large, the first comparator 100 transmits an intra-page coding enable signal to an intra-page coding circuit 83 of the intra-page coding unit 71.

The intra-page coding circuit 83 is a circuit for performing an intra-page coding process by which an error correction code (will be referred to as "row direction parity" hereinafter) "PX" every row, and an error correction code (will be referred to as "column direction parity" hereinafter) "PY" every column respectively are calculated with respect to the page data of the respective pages stored in the memory 62, as shown in FIG. 8, and the calculated error correction codes "PX" and "PY" are added to the data of the page. It should be understood that FIG. 8 indicates the intra-page coding process as to an "i"th page.

This intra-page coding circuit 83 sequentially reads out data of necessary symbols from the memory 62; calculates either a corresponding row-direction parity "PX" or a corresponding column-direction parity "PY" based upon the read data; and writes either the calculated row-direction parity "PX" or the calculated column-direction parity "PY" into the memory 62, so that the intra-page coding circuit 83 sequentially adds both the row-direction parity "PX" and the column-direction parity "PY" to each of the pages within the subject block.

Actually, when the intra-page coding enable signal is supplied form the first comparator 100, the intra-page coding circuit 83 transmits intra-block positional information to the address producing circuit 64, and also, an access request signal to the memory control circuit 63, while the intra-block positional information indicates a position (page address, row and column) of a symbol which is positioned in a first row and a first column of a first page within the subject block at this time.

In the case that the access request signal is supplied from the intra-page coding circuit 83, when the intra-page coding circuit 83 can access the memory 62, the memory control circuit 63 transmits an access permission signal for permitting this access to the intra-page coding circuit 83. At this time, the memory control circuit 63 transmits an access permission process selecting signal to an address producing circuit 64 and also a read signal to the memory 62 in combination with the above-described access permission signal, while the access permission process selecting signal permits the access by the intra-page coding circuit 83.

If the access permission process selecting signal is supplied from the memory control circuit 63, then the address producing circuit 64 produces an address of a position corresponding to both a row and a column, and notifies the produced address to the memory 62. The above-described row and column corresponding to the position of the produced address are indicated by intra-block positional information supplied from the intra-page coding circuit 83 within the page storage region 62AXY corresponding to a page address represented by the above-described intra-block positional information supplied from the intra-page coding circuit 83 within the block storage region 62AX which corresponds to a count value of an intra-page coding circuit-purpose block counter 84 (will be explained later) supplied from this intra-page coding circuit-purpose block counter 84 within the storage region provided by the memory 62. Thus, the data for 1 symbol which have been stored in this address are read out from the memory 62, and then, the read data are supplied via the data bus 75 to the intra-page coding circuit 83.

The intra-page coding circuit 83 acquires the data for this 1 symbol and stores the acquired data, and thereafter, similarly reads out data of all the symbols as to the first row of the first page. Then, when the intra-page coding circuit 83 accomplishes to read the relevant data of all the symbols, the intra-page coding circuit 83 calculates a row-direction parity "PX" (it is assumed that row-direction parity "PX" is constructed of "q" symbols) based upon these read data.

Also, the intra-page coding circuit 83 transmits the data of the first symbol within the calculated row-direction parity "PX" via the data bus 75 to the memory 62, and furthermore transmits intra-block positional information indicative of a position (page address, row and column) of this first symbol to the address producing circuit 64. Also, the intra-page coding circuit 83 transmits an access request signal to the memory control circuit 63 in combination with this intra-block positional information.

As a result, similar to the above-described operation for writing the page data into the memory 62 by the data input circuit 80, the data for 1 symbol of the row-direction parity "PX" transmitted from the intra-page coding circuit 83 to the memory 63 is stored in an address position corresponding to a row and a column indicated by intra-block positional information supplied from the intra-page coding circuit 83 within such a block storage region 62AX corresponding to a count value of the intra-page coding circuit-purpose block counter 84, which is supplied from the intra-page coding circuit-purpose block counter 84, within the storage regions supplied by the memory 62, and within such a page storage region 62AY corresponding to a page address indicated by the intra-block positional information.

Also, thereafter, the intra-page coding circuit 83 writes data of all the remaining symbols of this row-direction parity "PX" in a similar manner to the above manner. On the other hand, the intra-page coding circuit 83 similarly calculates other row-direction parities "PX" and respective column-direction parities "PY" within this page and writes the calculated parities "PX" and "PY" into the memory 62.

Then, when the intra-page coding process for 1 page is accomplished in the above-described manner, the intra-page coding circuit 83 transmits an intra-page coding completion signal to the intra-page coding circuit-purpose block counter 84.

The intra-page coding circuit-purpose block counter 84 is such a counter which counts a total number of blocks whose intra-page coding process have been accomplished. When new input data is supplied, this intra-page coding circuit-purpose block counter 84 is reset. Thereafter, every time the intra-page coding completion signal is supplied from the intra-page coding circuit 83, the intra-page coding circuit-purpose block counter 84 increments the count value by "1", and on the other hand, notifies the present count value to the address producing circuit 64. As a result, the data of the respective data are stored in the different block storage regions 62AX within the memory 62, which correspond to the count values of the intra-page coding circuit-purpose block counter 84, respectively.

Also, the intra-page coding circuit-purpose block counter 84 also notifies the present count value to the first comparator 100 and a second comparator 101 of the recording pattern producing process control unit 61.

The second comparator 101 compares the count value (corresponding to total number of blocks processed by intra-page coding circuit 71) of the intra-page coding circuit-purpose block counter 84 notified from this intra-page coding circuit-purpose block counter 84 with a count value (corresponding to total number of blocks processed by inter-page coding unit 72) of an intra-page coding circuit-purpose block counter 86 (will be discussed later), which is notified from the inter-page coding circuit-purpose block counter 86 of an inter-page coding unit 72 (will be explained later). When the count value of the intra-page coding circuit-purpose block counter 84 is large, the second comparator 101 transmits an inter-page coding enable signal to an inter-page coding circuit 85 of the inter-page coding unit 72.

The inter-page coding circuit 85 is a circuit for performing an inter-page coding process by which an error correction code (will be referred to as "page-direction parity" hereinafter) "PZ" (FIG. 10A and FIG. 10B) is calculated with respect to a block whose intra-page coding process has been accomplished based upon data of symbols in the same row and the same column of each page belonging to this block; and the calculated error correction codes are added to data of this block.

When the inter-page coding enable signal is supplied from the second comparator circuit 101, in a similar manner during the intra-data coding process, this inter-page coding circuit 85 sequentially reads out data of necessary symbols from the memory 62; calculates a page-direction parity "PZ" based upon the read data; and writes the calculated page-direction parity "PAZ" in the corresponding block storage region 62AX in the memory 62 in a similar manner during the intra-data coding process, so that the page-direction parities "PZ" are sequentially added to the subject block at this time.

In this case, in accordance with the present embodiment, as shown in FIG. 9A and FIG. 9B, an execution of the below-mentioned inter-page coding process is featured: That is, a single block 51 (FIG. 6) is divided into both an even page group 51E (FIG. 9A) made of only even pages, and an odd page group 51O (FIG. 9B) made of only odd pages; and then, the inter-page coding process is separately carried out with respect to these even page group 51E and odd page group 51O.

As a consequence, in the case that the inter-page coding circuit 85 calculates a page-direction parity "PZ" as to a certain column of a certain row, the page-direction parity "PZ" as to the even page group 51E is firstly calculated; the calculated page-direction parity "PZ" is written in the memory 62; thereafter, a page-direction parity "PZ" as to the odd page group 51O is calculated; and then, the calculated page direction parity "PZ" is written in the memory 62.

For instance, as shown in FIG. 10A, in the case that the inter-page coding circuit 85 calculates a page-direction parity "PZ" as to a "j"th column of an "O" row, the inter-page coding circuit 85 sequentially and firstly reads data (DT (0, 0, j)) of a symbol in the "j"th column of the "O" row of a page 0, data (DT (2, 0, j)) of a symbol in the "j"th column of the "O" row of a page 2, - - -, data (DT (21-2, 0, j) of a symbol in the "j"th column of the "O" row of a page (21-2) from the memory 62 so as to calculate page-direction parities (page-direction parities of even page group 51E) "PZ", and then, writes the calculated page-direction parities "PZ" in the memory 62.

Thereafter, as indicated in FIG. 10B, the inter-page coding circuit 85 sequentially reads data (DT (1, 0, j)) of a symbol in the "j"th column of the "O" row of a page 1, data (DT (3, 0, j)) of a symbol in the "j"th column of the "O" row of a page 3, - - -, data (DT (21-1, 0, j)) of a symbol in the "j"th column of the "O" row of a page (21-1) from the memory 62 so as to calculate page-direction parities (page-direction parities of odd page group 51O) "PZ", and then, writes the calculated page-direction parities "PZ" in the memory 62.

Then, the inter-page coding circuit 85 sequentially performs such a process with respect to all columns of all rows within the relevant block. As a result, as shown in FIG. 9A and FIG. 9B, to the even page group 51E and the odd page group 51O, parity pages 50P made of only the page-direction parities "PZ" are added respectively, the total number of which is equal to the symbol number of the page-direction parities PZ.

Also, when the inter-page coding circuit 85 accomplishes the inter-page coding processes as to the subject block in the above-described manner at this time, this inter-page coding circuit 85 transmits an inter-page coding completion signal to the inter-page coding circuit-purpose block counter 86.

The inter-page coding circuit-purpose block counter 86 is a counter for counting the total number of blocks to which inter-page coding processes have been accomplished. If new input data is supplied to the inter-page coding circuit-purpose block counter 86, then this block counter 86 is reset. Thereafter, every time the inter-page coding completion signal is supplied from the inter-page coding circuit 85, the inter-page coding circuit-purpose block counter 86 increments the count value by "1", and on the other hand, notifies the present count value to the address producing circuit 64. As a consequence, the above-explained inter-page coding process is sequentially carried out as to each of the blocks in which the data have been stored in the corresponding block storage region 62AX within the memory 62.

Also, the inter-page coding circuit-purpose block counter 86 also notifies the present count value to the second comparator 101 and a third comparator 102 of the recording pattern producing process control unit 61.

The third comparator 102 compares the count value (corresponding to total number of blocks processed by inter-page coding unit 72) of this inter-page coding circuit-purpose block counter 86, which is notified from the inter-page coding circuit-purpose block counter 86, with a count value (corresponding to total number of blocks processed by recording pattern producing unit 73) of a recording pattern production block counter 88 (will be explained later), which is notified from the recording pattern production block counter 88 of the recording pattern producing unit 73. When the count value of the inter-page coding circuit-purpose block counter 86 becomes large, the third comparator 102 transmits a recording pattern production enable signal to a recording pattern producing circuit 87 of the recording pattern producing unit 73.

The recording pattern producing circuit 87 is a circuit which produces recording patterns of respective pages within such a block that both the intra-page coding process and the inter-page coding process have been accomplished. When the recording pattern production enable signal is supplied from the third comparator 102, this recording pattern producing circuit 87 reads out data of a necessary symbol from the memory 62 in the unit of a page in a similar manner to that of the intra-data coding process, and performs predetermined signal processes (modulating process and adding process of synchronous data) with respect to the data read in the unit of the page, so that this recording pattern producing unit 87 produces a recording pattern as to this page. Also, the recording pattern producing unit 87 stores the recording patterns of the respective pages, which have been produced in the above-described manner, into the corresponding recording pattern storage regions 62BX respectively within the recording pattern storage pattern storing-purpose region 62B in the memory 62 in a similar manner to that when the intra-page coding process is performed.

Then, when the recording pattern producing circuit 87 accomplishes to produce the recording patterns of all pages with the subject blocks, the recording pattern producing circuit 87 transmits a recording pattern production completion signal to a recording pattern production block counter 88.

The recording pattern production block counter 88 is a counter for counting the total number of blocks whose recording pattern producing processes have been accomplished. If new input data is supplied to the recording pattern production block counter 88, then this block counter 88 is reset. Thereafter, every time the recording pattern production completion signal is supplied from the recording pattern producing circuit, the recording pattern production block counter 88 increments the count value by "1", and on the other hand, notifies the present count value to the address producing circuit 64. As a consequence, the above-explained recording pattern producing process is sequentially carried out as to each of the blocks in which the data have been stored in the corresponding block storage region 62AX within the memory 62.

Also, the recording pattern production block counter 88 notifies the present count value to a fourth comparator 103 and the third comparator 102 of the recording pattern producing process control unit 61.

The fourth comparator 103 compares the count value (corresponding to total number of blocks processed by recording pattern producing unit 73) of the recording pattern production block counter 88, which is notified from the recording pattern production block counter 88, with a count value (corresponding to total number of blocks processed by recording pattern transferring unit 74) of a recording pattern transfer block counter 90 (will be explained later), which is notified from the recording pattern transfer block counter 90 of a recording pattern transferring unit 74 (will be explained later). When the count value of the recording pattern production block counter 88 is larger than the count value of the recording pattern transfer block counter 90, the fourth comparator 103 transmits a recording pattern transfer enable signal to a recording pattern transferring circuit 89 of the recording pattern transferring unit 74.

Also, the fourth comparator 103 compares a value obtained by subtracting the count value of the recording pattern transfer block counter 90 from the count value of the recording pattern production block counter 88 with a maximum number ("N") of the recording pattern storage regions 62BX which can be set within the recording pattern storage-purpose region 62B of the memory 61. Then, when the former count value becomes larger than, or equal to the latter count value, the fourth comparator 103 transmits a disable (Disable) signal to the recording pattern producing circuit 87 in order to stop the recording pattern producing process by this recording pattern producing circuit 87, and on the other hand, thereafter, when the former count value becomes smaller than the latter count value, the fourth comparator 103 transmits a recording pattern production enable signal to the recording pattern producing circuit 87 in order to restart the recording pattern producing process by this recording pattern producing circuit 87. As previously described, in the present embodiment, since both the processing situations of the recording pattern producing unit 73 and the recording pattern transferring unit 74 are monitored, it is possible to effectively avoid that the recording patterns stored in the recording pattern storage-purpose region 62B are overwritten thereto, so that the recording patterns are deleted.

The recording pattern transferring circuit 89 is a circuit for transferring data of a block to the optical pickup 2 (FIG. 1), to which the recording pattern producing process by the recording pattern producing circuit 87 has been accomplished. When the recording pattern transfer enable signal is supplied from the fourth comparator 103, this recording pattern transferring circuit 89 reads out data of recording patterns of respective pages within a subject block at this time from the recording pattern storage-purpose region 62B of the memory 62 in a similar manner to that when the intra-data coding process is performed, and then, transfers these read data to the optical pickup 2.

Also, when the recording pattern transferring circuit 89 accomplishes to transfer the data of the recording patterns as to all pages within the subject block at this time to the optical pickup 2, the recording pattern transferring circuit 89 transfers a recording pattern transfer completion signal to the recording pattern transfer block counter 90.

The recording pattern transfer block counter 90 is a counter for counting the total number of blocks whose data transfer has been accomplished. When new input data is supplied, this recording pattern transfer block counter 90 is reset. Thereafter, every time the recording pattern transfer completion signal is supplied from the recording pattern transferring circuit 89, the recording pattern transfer block counter 90 increments the count value by "1", and on the other hand, notifies the present count value to the fourth comparator 103 of the recording pattern producing process control unit 61.

It should be noted that in the present embodiment, the count value (corresponding to total number of blocks processed by data input processing unit 70) of the data input circuit-purpose block counter 82 of the data input unit 70, and the count value (corresponding to total number of blocks processed by recording pattern producing unit 73) of the recording pattern production block counter 88 of the recording pattern producing unit 73 are supplied to a fifth comparator 104 of the recording pattern producing process control unit 61 respectively.

This fifth comparator 104 is employed in order to avoid that data destruction occurs in the memory 62, because the process by the data input unit 70 becomes excessively fast with respect to the processing speed of the recording pattern producing unit 73. When a value obtained by subtracting the count value of the recording pattern production block counter 88 from the count value of the data input circuit-purpose block counter 82 becomes larger than, or equal to a maximum number (M) of the block storage regions 62AX which can be set to the parity adding process-purpose region 62A of the memory 62, the fifth comparator 104 transmits a disable (Disable) signal to the data input circuit 80.

As a consequence, when the data input circuit 80 receives this disable signal, the data input unit 80 stops the process for writing the input data from the host into the memory 62, and transmits a data transfer interrupt request for requesting an interruption of the data transfer with respect to this host.

(2-2) Arrangement of Inter-Page Coding Circuit

Next, referring to FIG. 11, FIG. 12, and FIG. 13 (namely, partially enlarged view of FIG. 12), a description is made of a concrete arrangement and a concrete operation of the inter-page coding circuit 85.

While the inter-page coding circuit 85 is equipped with a process start signal producing circuit 110 at an input stage thereof, the inter-page coding circuit 85 inputs an inter-page coding enable signal "S1" supplied from the second comparator 101 of the recording pattern producing process control unit 61 to this process start signal producing circuit 110.

Upon receipt of the inter-page coding enable signal "S1" supplied from the second comparator 101 of the recording pattern producing process control unit 61, the process start signal producing circuit 110 transmits a process start trigger signal "S2" as indicated in FIG. 12(A) and FIG. 13(A), which rises in a pulse form at this timing, to a page address counter initial value setting circuit 111, a page counter initializing-purpose OR circuit 112, a row counter initializing-purpose OR circuit 113, a column counter initializing-purpose OR circuit 114, and an access command producing circuit 118.

When the process start trigger signal "S2" is supplied to the page address counter initial value setting circuit 111, this page address counter initial value setting circuit 111 outputs a page address counter initial value signal "S3" which designates a page from which data reading is started to both a page address counter 115 and an inter-page coding completion signal producing circuit 120. In the case of the present embodiment, as previously explained, since the inter-page coding process is separately carried out with respect to the even page group 51E (FIG. 9A) and the odd page group 51O (FIG. 9B) as to a single block, the page address counter initial value setting circuit 111 outputs "0" when the inter-page coding process is performed for the even page group 51E, and outputs "1" when the inter-page coding process is performed for the odd page group 51O, as shown in FIG. 12(B) and FIG. 13(B), as a value of the page address counter initial value signal "S3."

The page address counter 115 is a counter for counting a page address (number) of a page which should be processed by the inter-data coding process at this time. The page address counter 115 sets the page address counter initial value signal "S3" supplied from the page address counter initial value setting circuit 111 as an initial value, and thereafter, counts up its count value by every 2 values (FIG. 12(C) and FIG. 13(C)) every time an access permission signal "S13" (will be discussed later) is supplied from the memory control circuit 63 (namely, every time data for 1 symbol are read out from memory 62, or page-direction parities for 1 symbol are written in memory 62). As a consequence, when the even page group 51E is processed as the subject, the page address counter 115 sets "0" as the initial value and thereafter counts up its count value by every 2 values, whereas when the odd page group 51O is processed as the subject, the page address counter 115 sets "1" as the initial value and thereafter counts up its count value by every 2 values.

Also, when the own count value of the page address counter 115 reaches a predetermined number of pages as to both the even page group 51E and the odd page group 51O (namely, number calculated by adding total number of data pages 50D (refer to FIG. 9A and FIG. 9B) in even page group 51O to total number pages for parity pages 50P (refer to FIG. 9A and FIG. 9B), the page address counter 115 transmits a page group completion signal "S4" which rises in a pulse form at the timing thereof to both the page address counter initializing-purpose OR circuit 112 and the page counter initial value setting circuit 111.

As a consequence, as shown in FIG. 12(E) and FIG. 13(E), a page counter initializing signal "S5" which rises in a pulse form every time the page group completion signal is outputted (namely, every time page address counter 115 accomplishes to count predetermined number of pages as to even page group 51E and odd page group 51O) is supplied from the page address counter initializing-purpose OR circuit 112 to the page address counter 115.

Then, every time this page counter initializing signal "S5" rises, the page address counter 115 initializes the count value (refer to FIG. 12(C) and FIG. 13(C)). Also, when the page group completion signal "S4" rises, as previously explained, the page address counter initial value setting circuit 111 switches the value of the page address counter initial value signal "S3" from "0" to "1", or from "1" to "0."

On the other hand, the page address counter 115 transmits to the row address counter 116, such a page direction completion signal "S6" as shown in FIG. 12(D) and FIG. 13(D), which rises in a pulse form every time the inter-page coding processes for the even page group 51E and the odd page group 51O in a single column of a single row are accomplished.

The row address counter 116 is a counter for counting a total number of such a row which should be processed based upon the inter-page coding process at this time on a page (page having same page address as count value of page address counter 115) as a subject at this time. During an initial stage, this row address counter 116 resets the count value in response to the process start trigger signal "S2" supplied from the process start signal producing circuit 110 to the row counter initializing-purpose OR circuit 113 based upon the row counter initializing signal "S5" outputted from this row counter initializing-purpose OR circuit 113. Then, thereafter, every time a page direction completion signal "S6" supplied from the page address counter 115 rises, the row address counter 116 increments the count value by "1" (counts up by "1") as indicated in FIG. 12(F) and FIG. 13(F).

Also, the row address counter 116 transmits a row direction completion signal "S7" as shown in FIG. 12(G) and FIG. 13(G) to the row address counter-purpose OR circuit 113 and the column address counter 117, while the row direction completion signal "S7" rises in a pulse form at such a timing that the count value reaches a predetermined number of rows of a 1 page. As a result, based upon this row direction completion signal "S7", such a row address counter initializing signal "S8" as shown in FIG. 12(H) and FIG. 13(H) is supplied from the row address counter-purpose OR circuit 113 to the row address counter 116 at the timing when the count value of the row address counter 116 reaches the total row number of 1 page. Then, the row address counter 116 initializes the count value every time this row counter initializing signal "S8" is supplied. As a result, the row address counter 116 is reset every time the row address counter 116 counts numeral value of the total row number of the 1 page.

The column address counter 117 is a counter for counting a column in which a symbol is present, while this symbol should be processed by the inter-data coding process in a corresponding row (same row as count value of row address counter 116) of a corresponding page (page of same page address as count value of page address counter 115). During an initial stage, this column address counter 117 resets the count value in response to the process start trigger signal "S2" supplied form the process start signal producing circuit 110 based upon the column counter initializing signal outputted from the column counter initializing-purpose OR circuit 114. Then, thereafter, every time a row direction completion signal "S7" supplied from the row address counter 116 is supplied, the column address counter 117 increments the count value by "1" (counts up by "1") as indicated In FIG. 12(I) and FIG. 13(I).

Also, the column address counter 117 transmits a column direction completion signal "S9" as shown in FIG. 12(J) and FIG. 13(J) to the column address counter-purpose OR circuit 114 and an inter-page coding completion signal producing circuit 120, while the column direction completion signal "S9" rises in a pulse form at such a timing that the count value reaches a predetermined number of columns of a 1 page. As a result, based upon this column direction completion signal "S9", such a column address counter initializing signal "S10" as shown in FIG. 12(K) and FIG. 13(K) is supplied from the column address counter-purpose OR circuit 10 to the column address counter 117. Also, the column address counter 117 initializes the count value every time this column counter initializing signal "S10" is supplied. As a result, the column address counter 117 is reset every time the column address counter 117 counts the numeral value of the total column number of the 1 page.

On the other hand, each of the respective count values of the page address counter 115, the row address counter 116, and the column address counter 117 is supplied as an access address signal "S11" to an access command producing circuit 118.

When the process start trigger signal "S2" is supplied from the process start signal producing circuit 110, the access command producing circuit 118 transmits an access request signal "S12" to the memory control unit 63 (FIG. 7). On the other hand, as the result of the access request signal "S12", when an access permission signal "S13" is supplied from the memory control circuit 63, the access command producing circuit 118 produces an intra-block positional information signal "S14" (corresponding to above-described intra-block positional information), and then transmits this produced intra-block positional information signal "S14" to the address producing circuit 118. In the above-described intra-block positional information signal "S14", present count values of the page address counter 115, the row address counter 116, and the column address counter 117, which are recognized based upon the access address signal "S11", are defined as a page address, a row number, and a column number, respectively. Also, the access command circuit 118 sequentially stores data for 1 symbol read out from the corresponding position, transmitted via the data bus 75 (FIG. 7) from the memory 62 as this result.

Then, the access command circuit 118 repeatedly performs a similar process operation until the access command circuit 118 has acquired data of symbols, the total number of which is equal to the unit number of the inter-page coding process (namely, total number obtained by adding total page number of data page 50D (FIG. 6) within odd page group 51O and even page group 51E to total page number of parity page 50P (FIG. 6) within odd page group 51O and even page group 51E). Then, if the access command circuit 118 finally acquires the data of the symbols whose total number is equal to the unit number of the inter-page coding process, then the access command circuit 118 collects the data of these symbols to each other, and transmits the collected data to an error correction code calculating circuit 119 as page-direction parity calculation-purpose data "S15."

When the page-direction parity calculation-purpose data "S15" is supplied from the access command producing circuit 118, the error correction code calculating circuit 119 calculates a page-direction parity "PZ" (FIG. 10A, FIG. 10B) based upon this page-direction parity calculation-purpose data "S15" (refer to FIG. 12(L) and FIG. 13(L)), and transmits the obtained page-direction parity "PZ" to the access command producing circuit 118. It should also be noted that the error correction coding calculation circuit 119 transmits a parity calculation situation signal "S16" for indicating whether or not the page-direction parity is presently being calculated to the access command producing circuit 118.

When the access command producing circuit 118 recognizes based upon the parity calculation situation signal "S16" that the calculation of the page-direction parity "PZ" by the error correction code calculating circuit 119 is accomplished, the access command producing circuit 118 subsequently receives the page-direction parity "PZ" supplied from the error correction code calculating unit 119, and transmits an access request "S12" constructed of a data writing request to the memory control circuit 63. Then, as a result, when the access permission signal "S13" is supplied from the memory control circuit 63, the access command producing circuit 118 transmits this page-direction parity "PZ" only for 1 symbol to the memory 62 via the data bus 75, and transmits the intra-block positional information "S14" to the address producing circuit 64, while the intra-block positional information "S14" represents the page address, the row number, and the column number expressed by the access address signal "S11." As a result, the page-direction parities "PZ" for 1 symbol are stored in the corresponding block storage region 62AX within the memory 62. Thereafter, the access command producing circuit 118 similarly stores in the memory 62, data of remaining symbols of the page-direction parities "PZ" calculated in the error correction code calculating circuit 119 at this time.

Moreover, the access command producing circuit 118 repeatedly performs such a process until the inter-data coding process for the even page group 51E and the odd page group 51O, which constitute subjects at this time, is accomplished. As a result, the page-direction parities "PZ" for the block as the subject at this time are sequentially transmitted, and then, are sequentially stored in the memory 62.

On the other hand, if a column direction completion signal "S9" is supplied from the column address counter 117 under such a situation that the value of the page address counter initial value signal "S3" supplied from the page address counter initial value setting circuit 111 is "1", the inter-page coding completion signal producing circuit 120 transmits an inter-page coding completion signal "S17" as shown in FIG. 12(M) and FIG. 13(M) to the inter-page coding circuit-purpose block counter 86 (FIG. 7), as previously explained. As a result, as previously explained, the count value of the inter-page coding circuit-purpose block counter 86 is incremented by "1."

Also, the inter-page coding completion signal producing circuit 120 transmits the above-described inter-page coding completion signal "S17" to the process start signal producing circuit 110. When the inter-page coding completion signal "S17" is supplied under such a situation that the inter-page coding enable signal "S1" is supplied from the second comparator 101, the process start signal producing circuit 110 transmits the process start trigger signal "S2." As a result, an inter-page coding process is commenced with respect to a next block.

It should be noted that a concrete arrangement of the process start signal producing circuit 110 is represented in FIG. 14. As apparent also from FIG. 14 the process start signal producing circuit 110 is arranged by first and second D flip-flop circuits 130 and 131; first and second AND circuit 132; and an OR circuit 134.

Then, the inter-page coding enable signal "S1" is supplied to the first D flip-flop circuit 130, an output of the first D flip-flop circuit 130 is inverted, and the inverted output is supplied to an input terminal of the first AND circuit 132. Also, as shown in FIG. 15 (A), such an inter-page coding enable signal "S1" is supplied to the other input terminal of the first AND circuit 132, while this inter-page coding enable signal "S1" rises to a high level in a time period (time instant "t1" to time instant "t6") during which the coding process by the intra-page coding unit 71 (FIG. 7) progresses rather than the coding process by the inter-page coding unit 72 (FIG. 7) by at least 1 block. As a result, a first AND output signal "S20" which rises in a pulse form at rising timing (time instants "t1" and "t7") of the inter-page coding enable signal "S1" is outputted from the first AND circuit 132, and then, this first AND output signal "S20" is supplied to one input terminal of the OR circuit 134.

Also, the inter-page coding completion signal "S17" from the inter-page coding completion signal producing circuit 120 is supplied to the second D flip-flop circuit 131, and an output of this second D flip-flop circuit 131 is supplied to one input terminal of the second AND circuit 133. Also, as indicated in FIG. 15(B), such an inter-page coding completion signal "S17" which rises in a pulse form every time the inter-page coding process of 1 block is accomplished is supplied to the other input terminal of the second AND circuit 133. As a result, a second AND output signal "S21" is outputted from the second AND circuit 133, while the second AND output signal "S21" rises at such a timing (namely, timing at which inter-page coding unit 72 has accomplished inter-page coding process for 1 block under such a situation that coding process by intra-page coding unit 71 progresses rather than coding process by inter-page coding unit 72 by more than 1 block) that the inter-page coding completion signal "S17" rises under such a situation that the inter-page coding enable signal "S1" has risen. Then, this second AND output signal "S21" is supplied to the other input terminal of the OR circuit 134.

As a consequence, the OR circuit 134 outputs such a process start trigger signal "S2" (shown in FIG. 15 (C)) which rises at timing when both the first AND output signal "S20" supplied from the first AND circuit 132 and the second AND output signal "S21" supplied from the second AND circuit 133 have risen in high levels.

In this case, the above-described process start trigger signal "S2" sequentially rises at timing (time instants t2, t3, t4, t5, and t8) that the inter-page coding process of 1 block is accomplished when the intra-page coding process by the intra-page coding unit 71 progresses rather than the inter-page coding process by the inter-page coding unit 72 by more than 1 block. However, at a stage that the inter-page coding process has reached the intra-page coding process (namely, situation that inter-page coding enable signal is in a low level: time instant "t6"), since the process start trigger signal "S2" dose not rise, it is possible to effectively avoid that the inter-page coding process surpasses the intra-page coding process.

FIG. 16 shows an outline of a flow of inter-page coding process operation executed in the inter-page coding circuit 85 arranged in the above-described manner.

This inter-page coding circuit 85 waits that either the inter-page coding enable symbol "S1" supplied from the second comparator 101 (FIG. 7) or the inter-page coding completion signal "S17" supplied from the inter-page coding completion signal producing circuit 120 is applied to the process start signal producing circuit 110 (SP 40); and when either inter-page coding enable signal "S1" or the inter-page coding completion signal "S17" is finally applied to the process start signal producing circuit 110, a count value "K3" of the column address counter 117 and a count value "K2" of the row address counter 116 are initialized (set to "0") based upon the process start trigger signal "S2" outputted from this process start signal producing circuit 110 (SP 41 and SP42).

Subsequently, based upon the page address counter initial value signal "S3" outputted from the page address counter initial value setting circuit 11, "0" corresponding to the initial value for the even page group is set as an initial value of a count value "K1" of the page address counter 115 (SP 43), and also, based upon the process start trigger signal "S2" outputted from the process start signal producing circuit 110, the count value "K1" of the page address counter 115 is initialized (SP 44).

Next, the access command producing circuit 118 is initiated based upon the process start trigger signal "S2" outputted from the process start signal producing circuit 110, and at this time, data of a symbol is read out from the memory 62, which is located at an address position corresponding to a page address, a row number, and a column number, which are indicated based upon the access address signal "S11" supplied to the access command producing circuit 118 (SP 45). This process is repeatedly carried out until the data of the symbols in the same row and the same column as to the preceding page within the even page group (SP 45 to SP 47-SP 45).

Then, when the count value "K1" of the page address counter 115 reaches the same numeral as the total page number of data page 50D (FIG. 6) within the even page group, the data of the respective symbols read out from the memory 62 at this time are supplied from the access command producing circuit 118 to the error correction code calculating circuit 119; and based upon these data, page-direction parties "PZ" as to the row and the column of this even page group are calculated in the error correction code calculating circuit 119 (SP 48).

Thereafter, the page-direction parities "PZ" calculated in the above-described manner are written into address positions within the memory 62 every 1 symbol, which corresponds to page addresses, row numbers, and column numbers indicated by the access address signal "S11" (SP 49 to SP 51-SP 49).

Then, when the count value "K1" of the page address counter 115 finally reaches the same numeral as all the page numbers within the even page group (otherwise, odd page group), the page group completion signal "S5" is supplied from the page address counter 115 to the page address counter initial value setting circuit 111 and the page address counter-purpose OR circuit 112; "1" being equal to the initial value for the odd page group is set as the initial value of the page address counter 115 based upon this page group completion signal "S5"; and also, the page address counter 115 is initialized (SP 52, SP 53).

Subsequently, a similar process is carried out as to the odd page group (SP 44 to SP 52); and when the inter-data coding process with respect to the odd page group is accomplished, the page direction completion signal "S6" is supplied from the page address counter 115 to the row address counter 116, so that the count value of the row address counter 116 is counted up by "1" (SP 54 and SP 55); thereafter, "0" being equal to the initial value for the even page group is set as the initial value of the page address counter 115; and a similar process is repeatedly carried out after the similar process has been carried out as to a new row where the page address counter 115 is initialized (SP 43 to SP 54-SP 43).

Then, when the count value "K2" of the row address counter 116 finally reaches the same numeral value as the total row number of 1 page, the row direction completion signal "S7" is supplied from the row address counter 116 to the row address counter 117, so that the count value of the column address counter 117 is counted up by 1 (SP 56, SP 57). Also, this row direction completion signal "S7" is supplied to the row address counter-purpose OR circuit 113, so that the row address counter 116 is initialized, and thereafter, a similar process is repeatedly carried out (SP 42 to SP 56).

Then, if the above-explained process has been accomplished with respect to all the rows and all the columns, then the inter-page coding circuit 85 waits that either the inter-page coding enable symbol "S1" supplied from the second comparator 101 (FIG. 7) or the inter-page coding completion signal "S17" supplied from the inter-page coding completion signal producing circuit 120 is again applied to the process start signal producing circuit 110; and when either inter-page coding enable signal "S1" or the inter-page coding completion signal "S17" is applied to the process start signal producing circuit 110, a similar process is repeatedly performed as to a next block (SP 40 to SP 56-SP 40).

(3) Advantages of Present Embodiment

As previously described, in the optical information recording/reproducing device 1 according to the present embodiment, the page belonging to one block are divided into the even page group 51E and the odd page group 51O and the inter-page coding processes are performed with respect to these page groups, the pages which are recorded by the angular multiplexing manner on the hologram disk 7 and are located adjacent to each other are divided into the different page groups, and the inter-page error correction codes are calculated. As a consequence, even in such a case that the crosstalk occurs between the adjoining pages during the reproducing operation, the error bits are dispersed to the different page groups, so that the correction capability by the inter-page error correction codes can be improved, and thus, the reproduction information having the superior quality can be obtained.

(4) Other Embodiments

It should be understood that in the above-described embodiment, the present invention has been applied to the optical information recording/reproducing device 1 with employment of the arrangement shown in FIG. 1. However, the present invention is not limited only to the above-described optical information recording/reproducing device 1, but may be widely applied to optical information recording/reproducing devices having other arrangements, or optical information recording devices, which angle-multiplex data for plural pieces of pages and record the angle-multiplexed data on the same recording region of the hologram disk 7.

Also, the above-explained embodiment has described such a case that the intra-page coding circuit 83 performs only the intra-page coding process. However, the present invention is not limited only to the above case, but may be alternatively realized as follows: That is, the intra-page coding circuit 83 may perform a scramble process for encrypting page data, a page address adding process for adding page addresses, and/or a process for adding error correction codes after an error detecting/coding process has been executed.

Moreover, the above-explained embodiment has described such a case that the inter-page coding circuit 85 divides pages contained in a single block into the even page group 51E and the odd page group 51O, namely two page groups, and separately performs the inter-page coding process every page group. However, the present invention is not limited only to the above-case, but may be alternatively realized if the pages contained in one group are divided into a plurality of page groups in such a manner that pages which are recorded adjacent to each other by being angle-multiplexed do not belong to the same group: That is, while the pages contained in one block may be divided into more than 3 page groups, the inter-page coding process may be separately carried out for each of these divided page groups.

FIG. 17 is a flow chart for describing a series of flow operations of inter-page coding processes performed in the inter-page coding circuit 85 in the case that the pages contained in one block are divided into 3, or more page groups. This, inter-page coding process has only such a technical different point that in the steps SP 66, SP 68, and SP 70, page group numbers divided at this time are entered to characters of "k", and other processes defined in the steps SP 60 to SP 76 are similar to those shown in FIG. 16.

While the embodiments have been described, the present invention is not limited only thereto, but may be changed and modified in various manners within the accompanying scope of claims of the present invention, which may be obvious for a person skilled in the art.

BRIEF DESCRIPTION OF THE DRAWINGS

FIG. 10A is a conceptional diagram for explaining an inter-page coding process.

FIG. 11 is a block diagram for showing a concrete structural example of an inter-page coding circuit.

Figure 1:
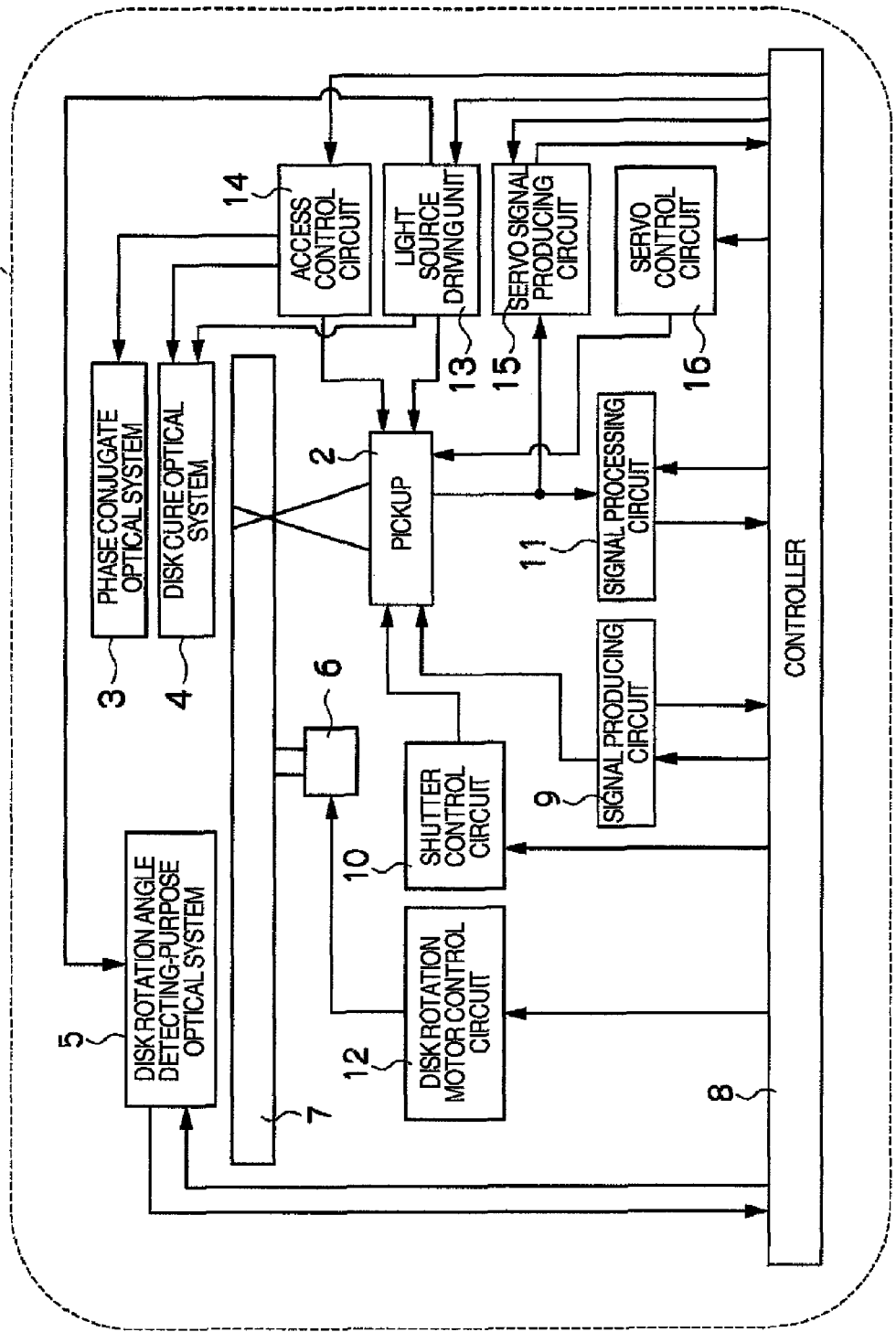
FIG. 1 is a block diagram for showing an arrangement of an optical information recording/reproducing device according to a present embodiment.
Figure 2:
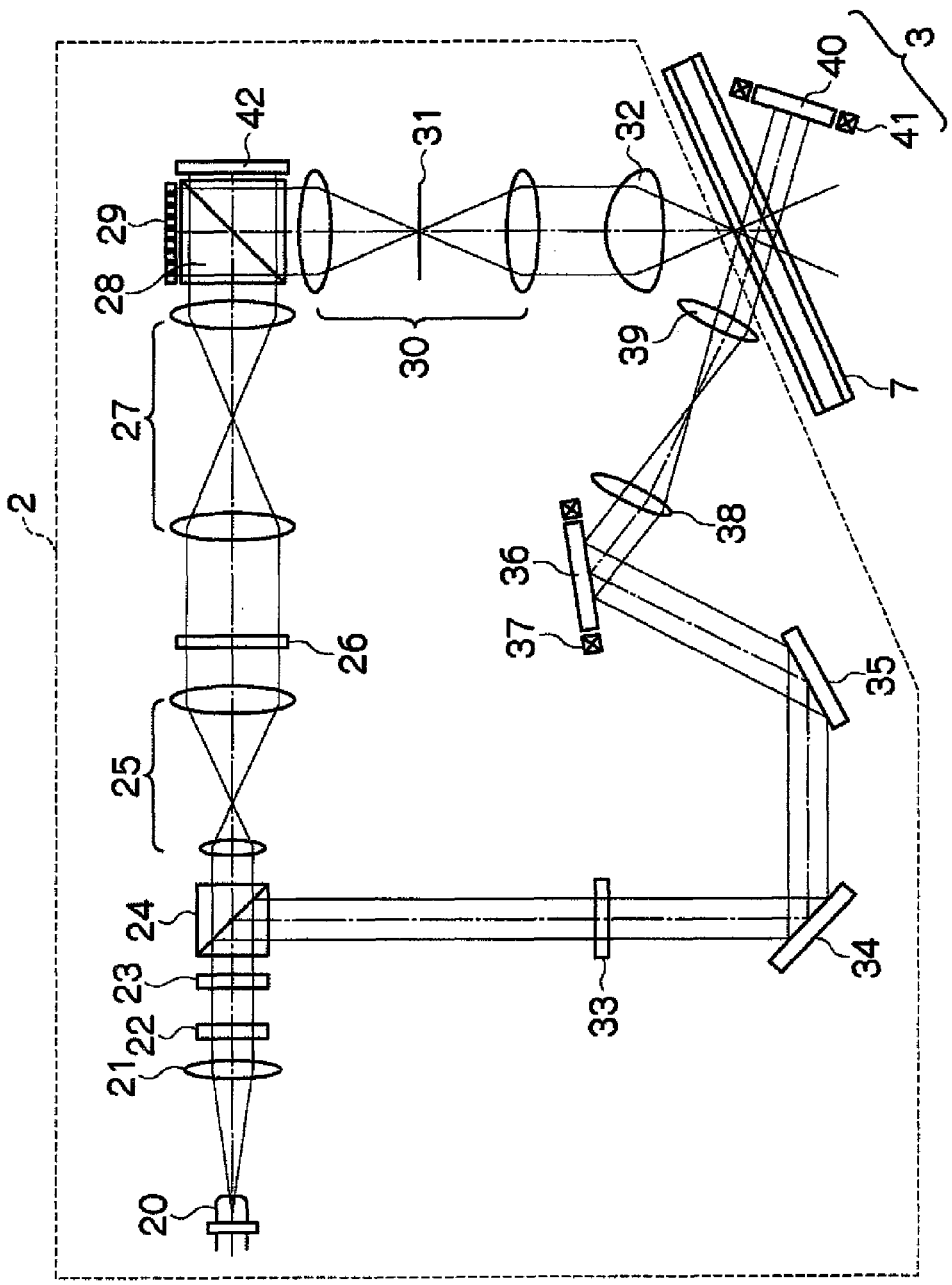
FIG. 2 is a conceptional diagram for indicating an arrangement of an optical system of an optical pickup.
Figure 3:
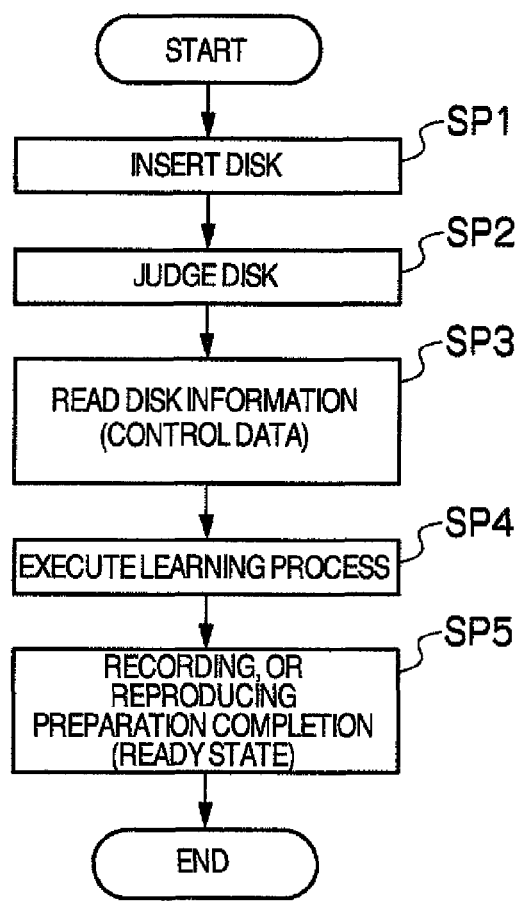
FIG. 3 is a flow chart for explaining a recording/reproducing preparation process in the optical information recording/reproducing device.
Figure 4:
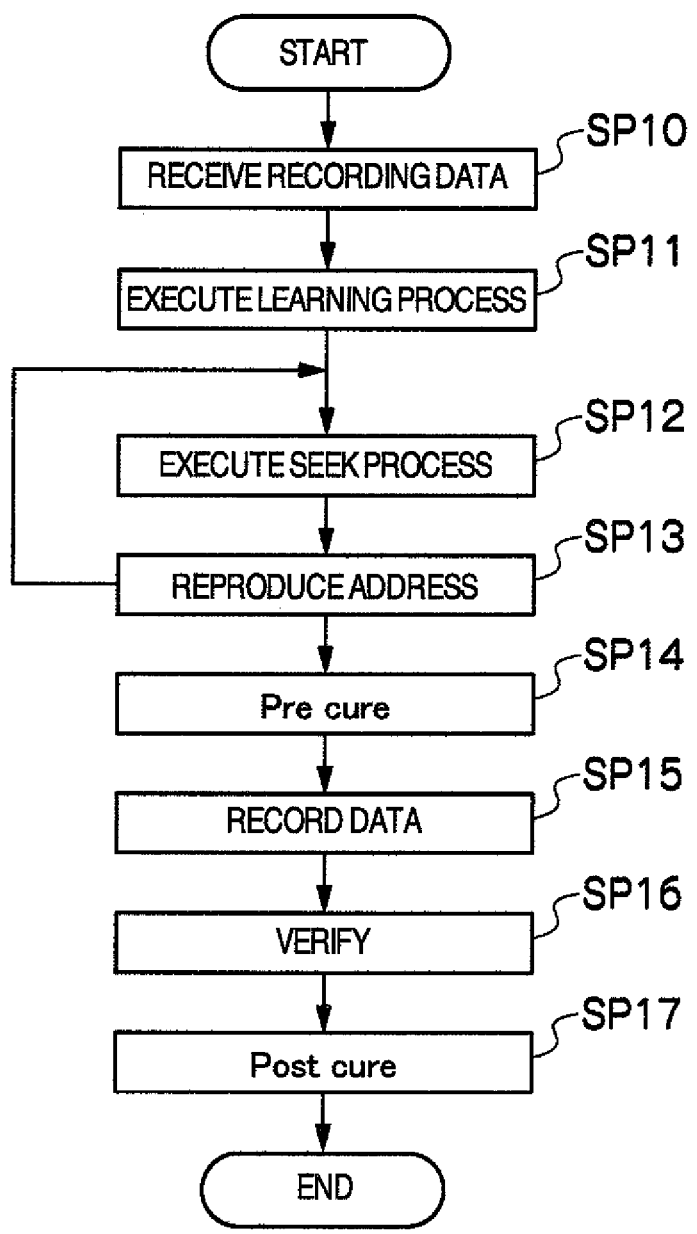
FIG. 4 is a flow chart for explaining a recording process in the optical information recording/reproducing device.
Figure 5:
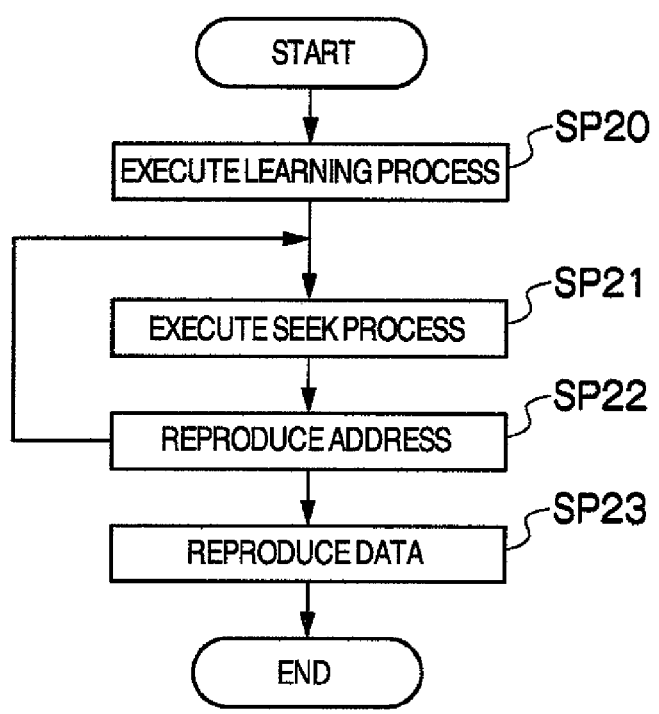
FIG. 5 is a flow chart for explaining a reproducing process in the optical information recording/reproducing device.
Figure 6:
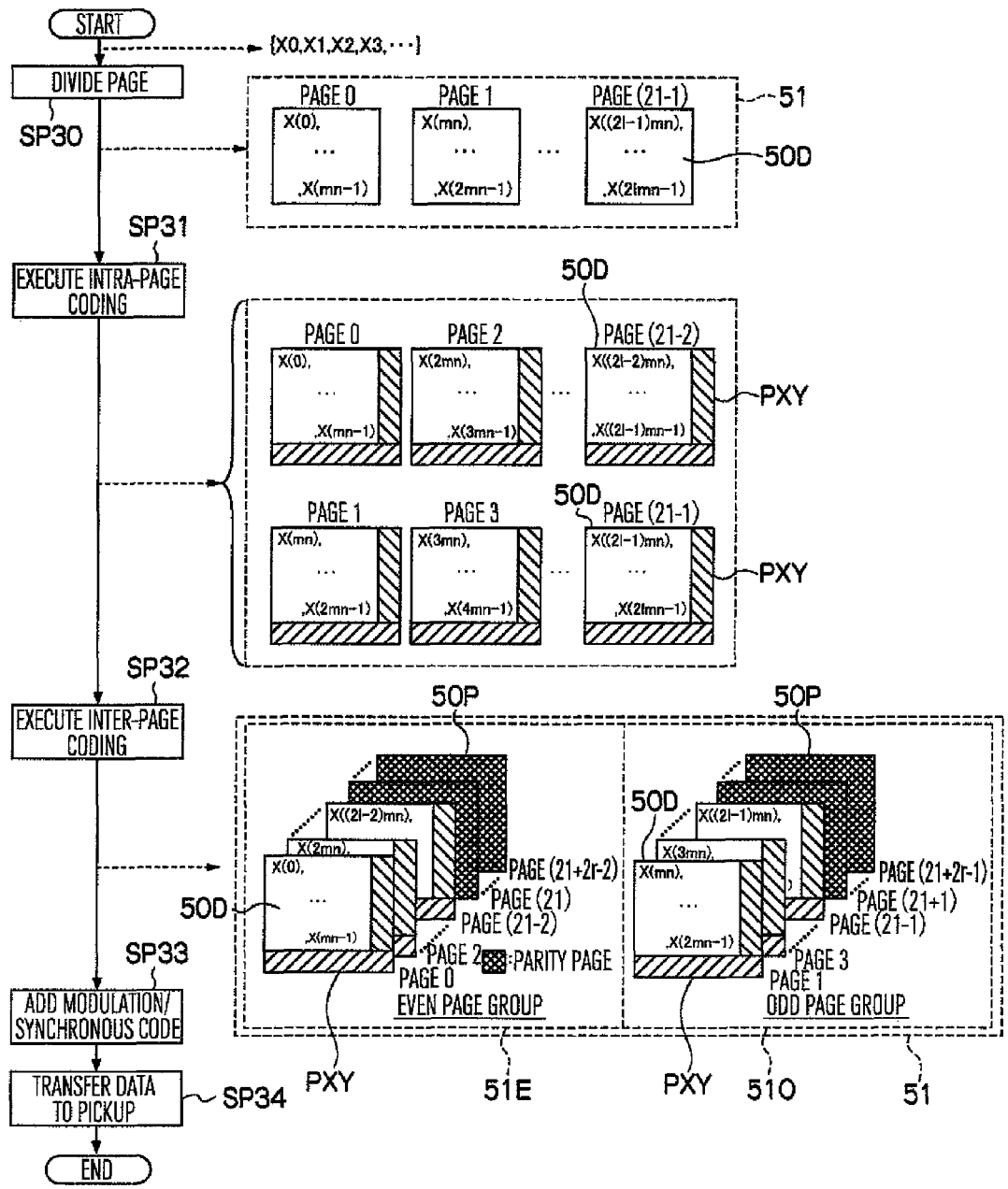
FIG. 6 is a conceptional diagram for indicating a series of information signal producing process flows executed in a signal producing unit.
Figure 7:
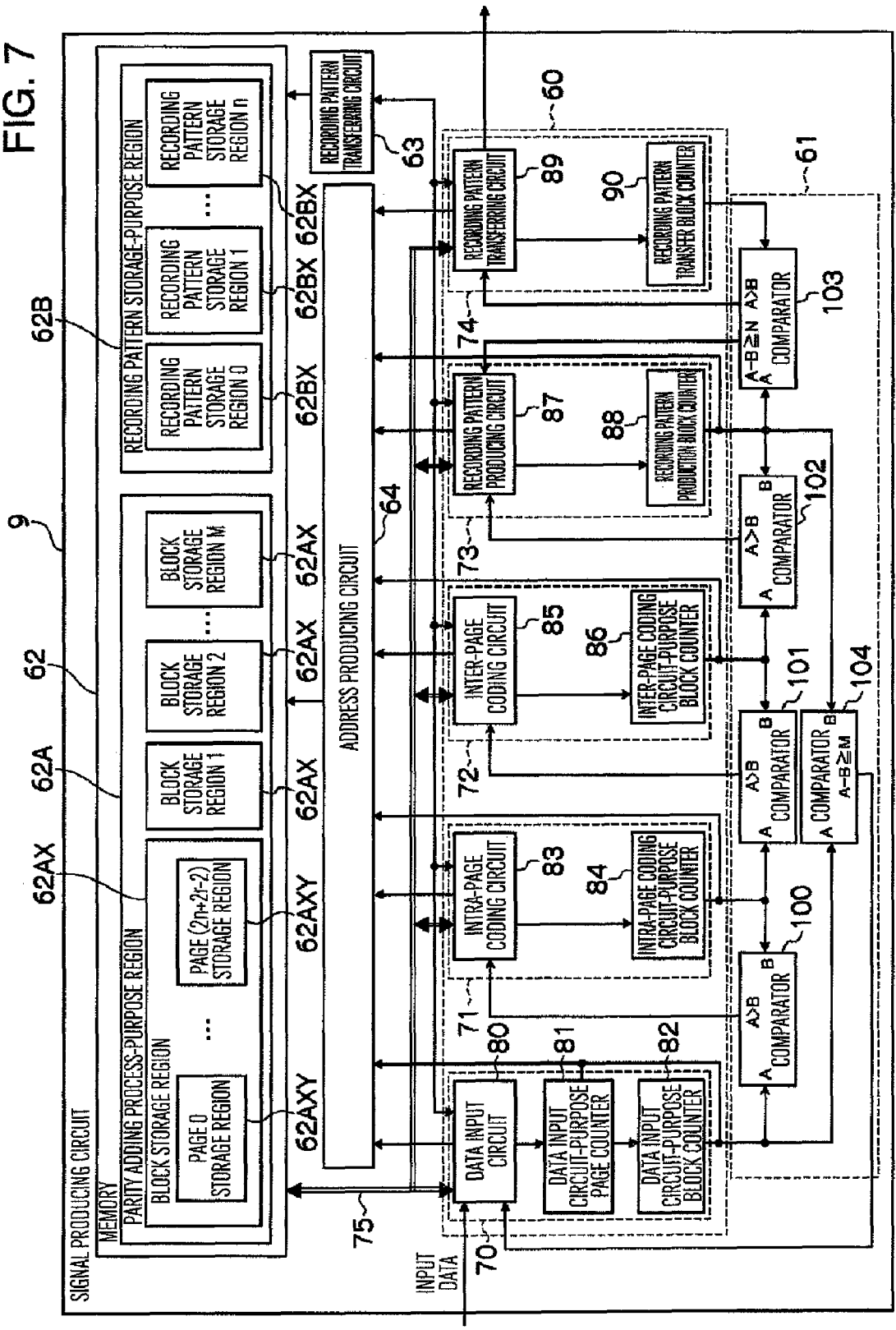
FIG. 7 is a block diagram for representing a concrete structural example of the signal producing circuit.
Figure 8:
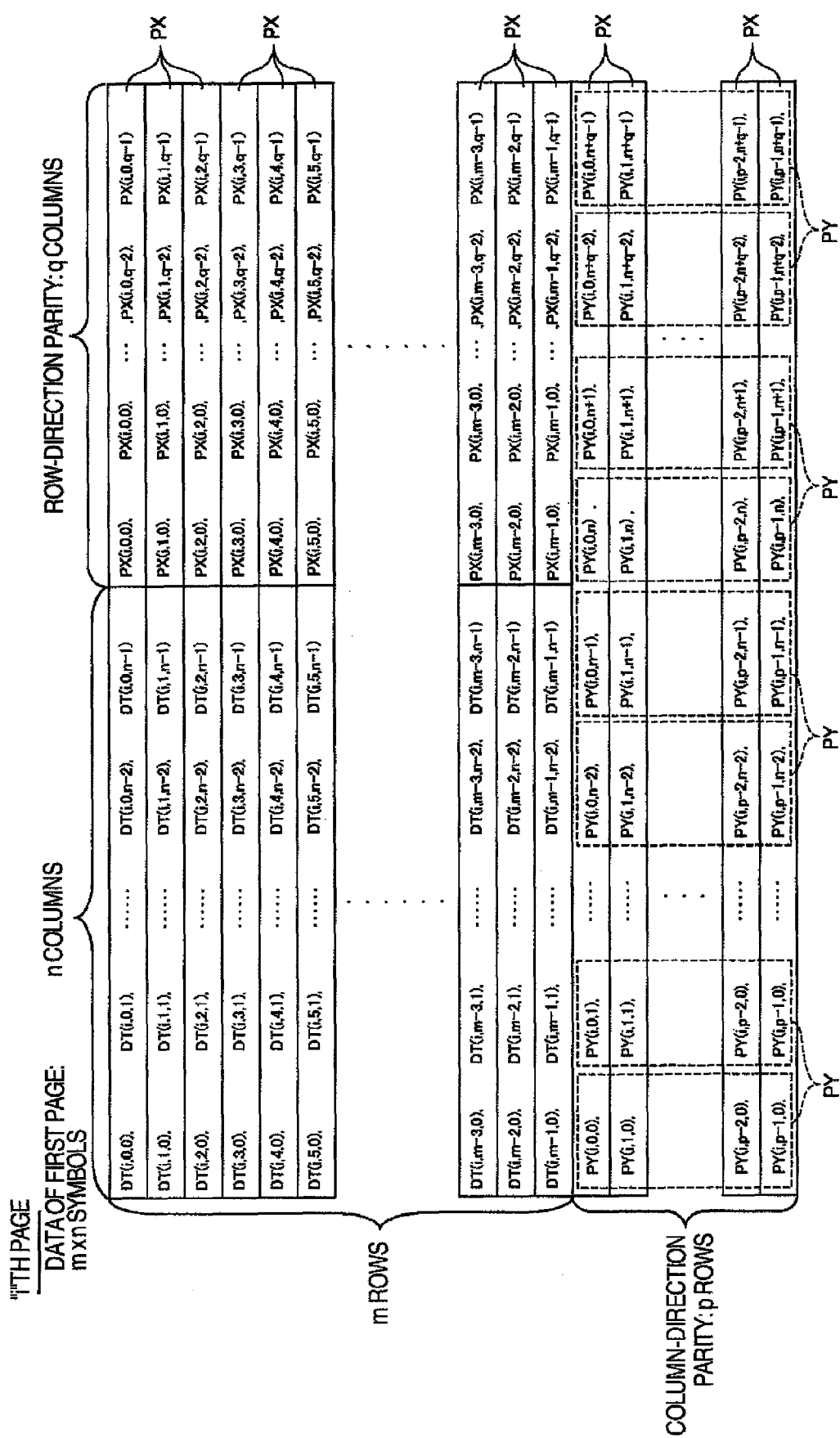
FIG. 8 is a conceptional diagram for describing an intra-page coding process.
Figure 9A:
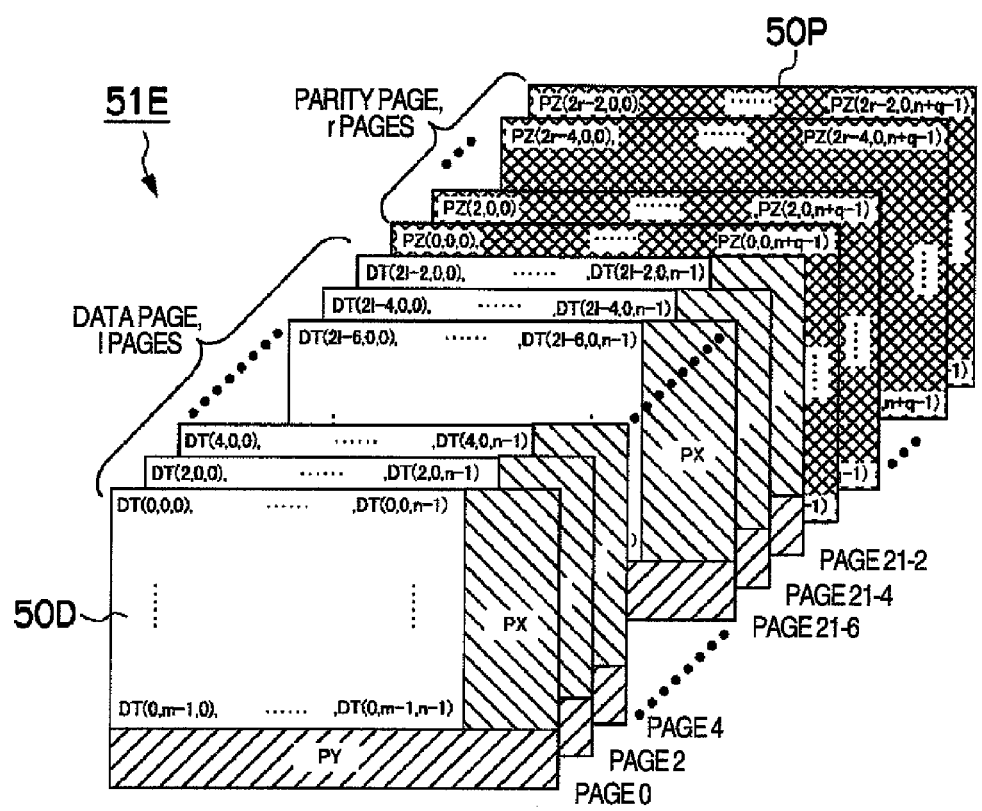
FIG. 9A is a conceptional diagram for explaining an inter-page coding process.
Figure 9B:
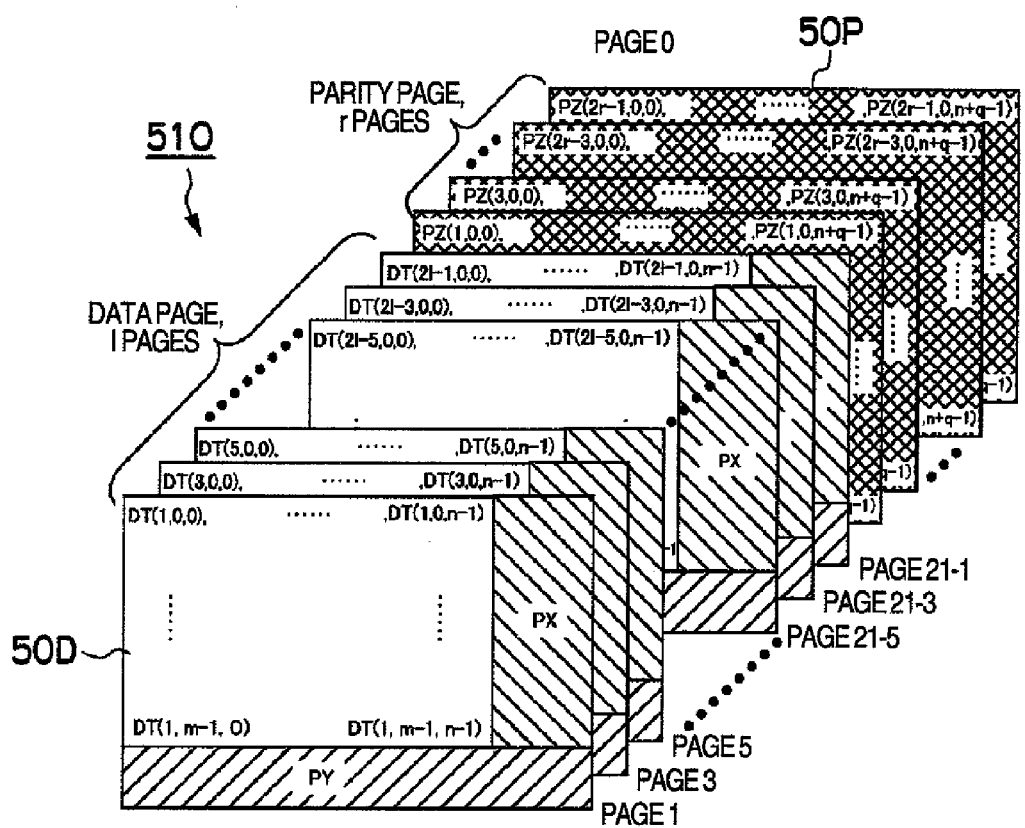
FIG. 9B is a conceptional diagram for explaining an inter-page coding process.
Figure 10B:
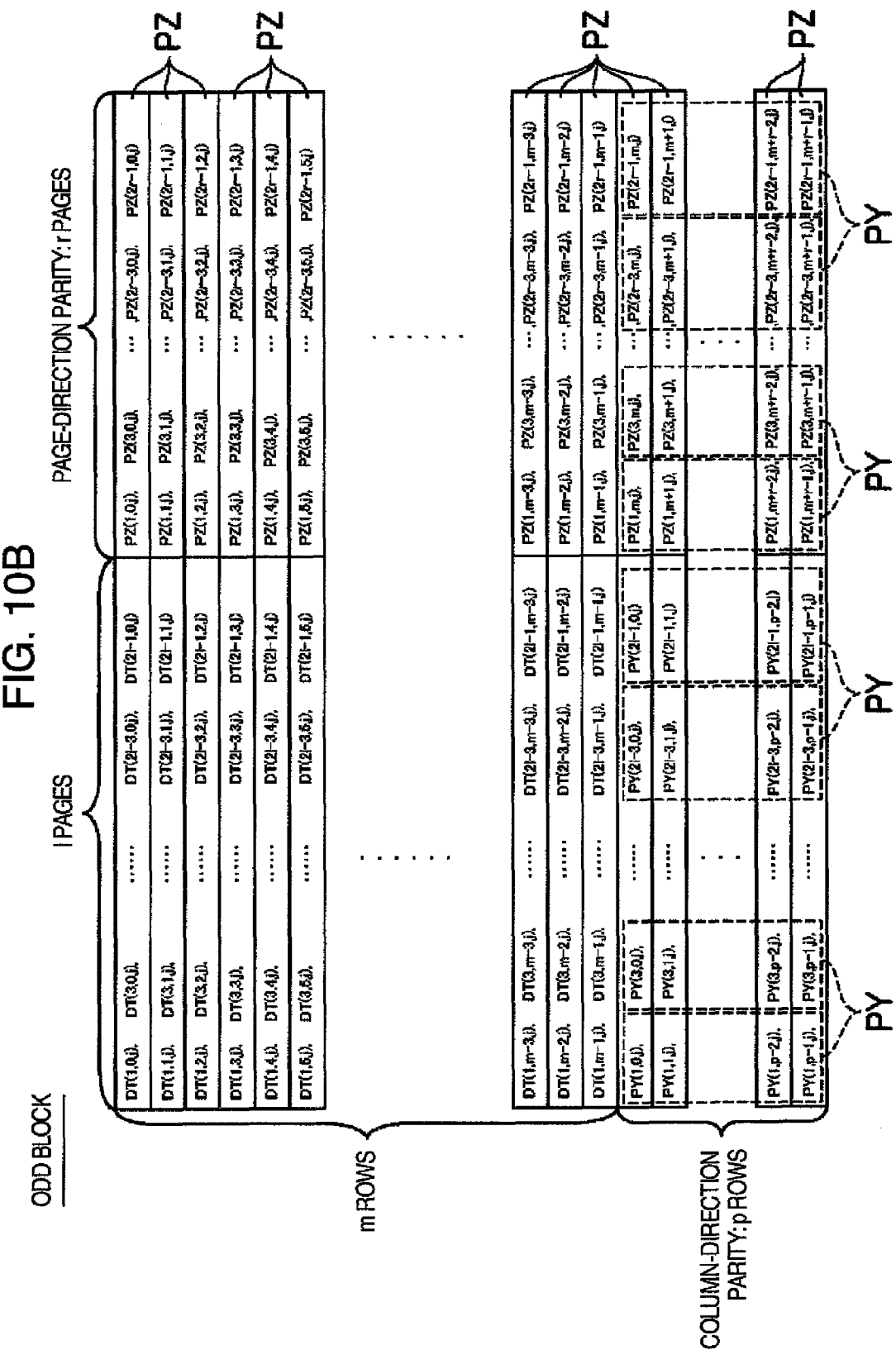
FIG. 10B is a conceptional diagram for explaining an inter-page coding process.
Figure 12:
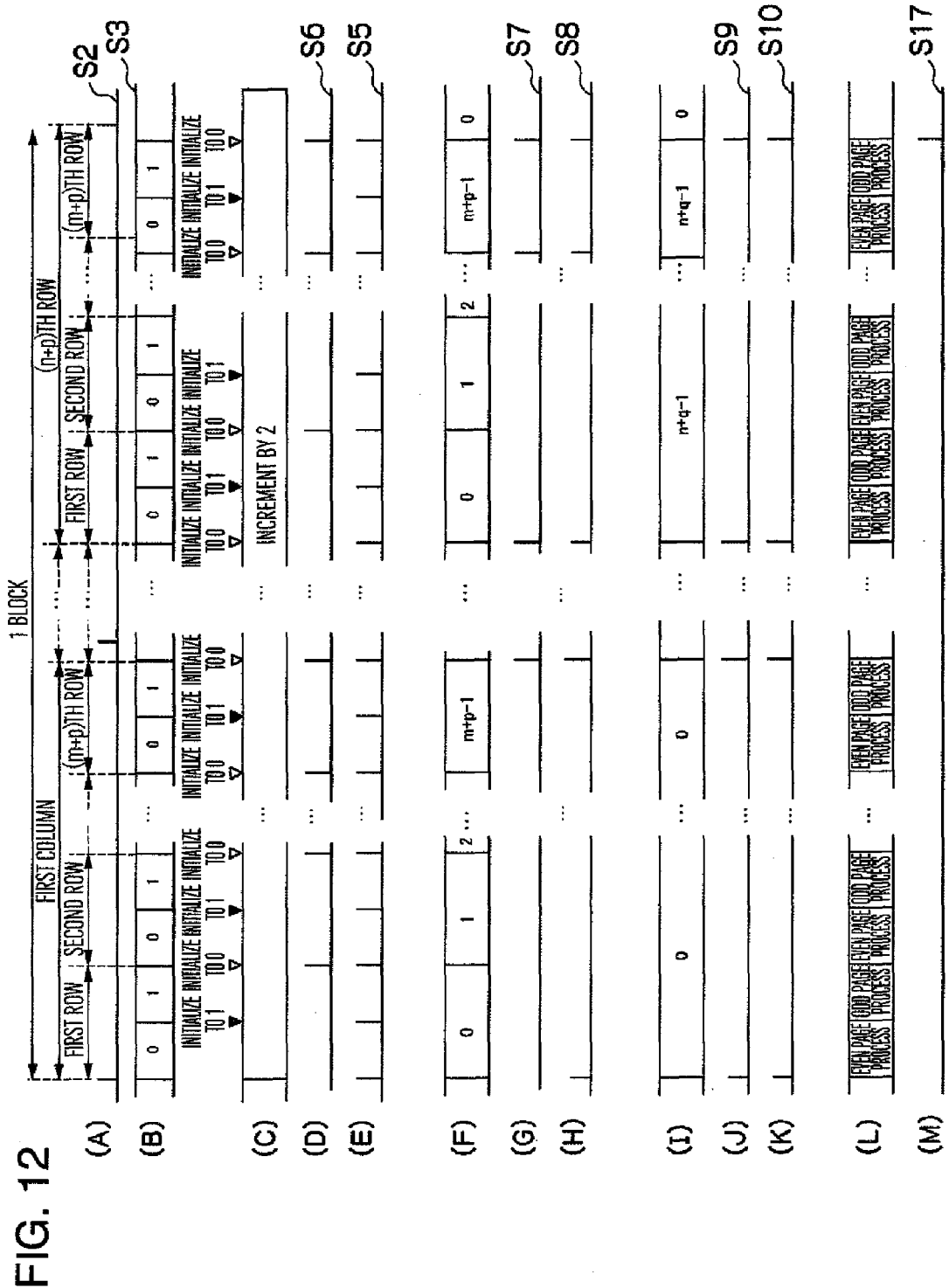
FIG. 12 is a timing chart for explaining a process content of the inter-page coding circuit.
Figure 13:
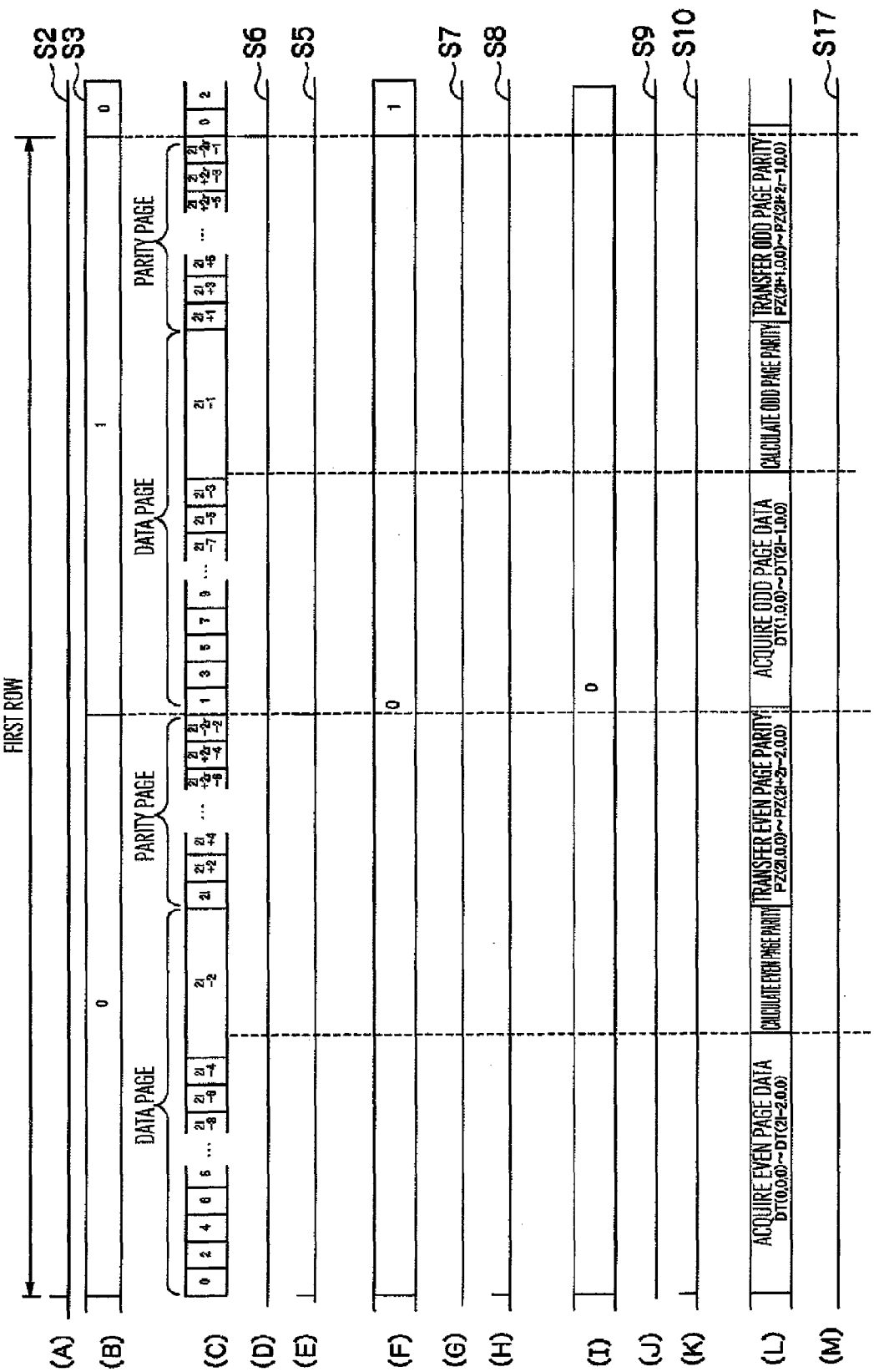
FIG. 13 is a timing chart for explaining a process content of the inter-page coding circuit.
Figure 14:
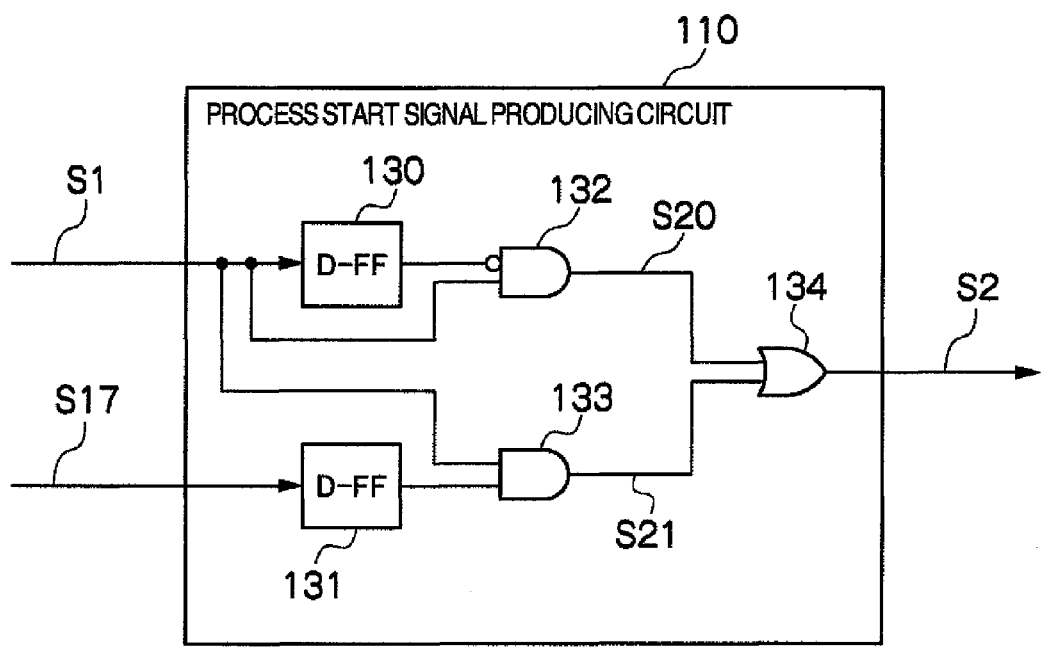
FIG. 14 is a circuit diagram for showing a concrete arrangement of a process start signal producing circuit.
Figure 15:
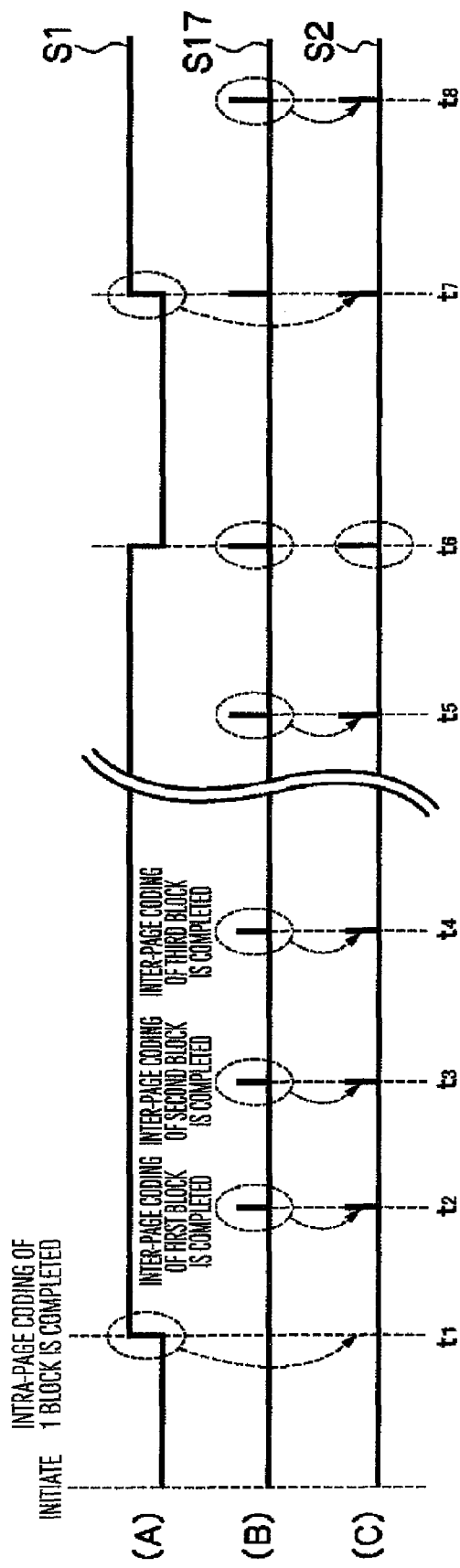
FIG. 15 is a timing chart for explaining a process content of the process start signal producing circuit.
Figure 16:
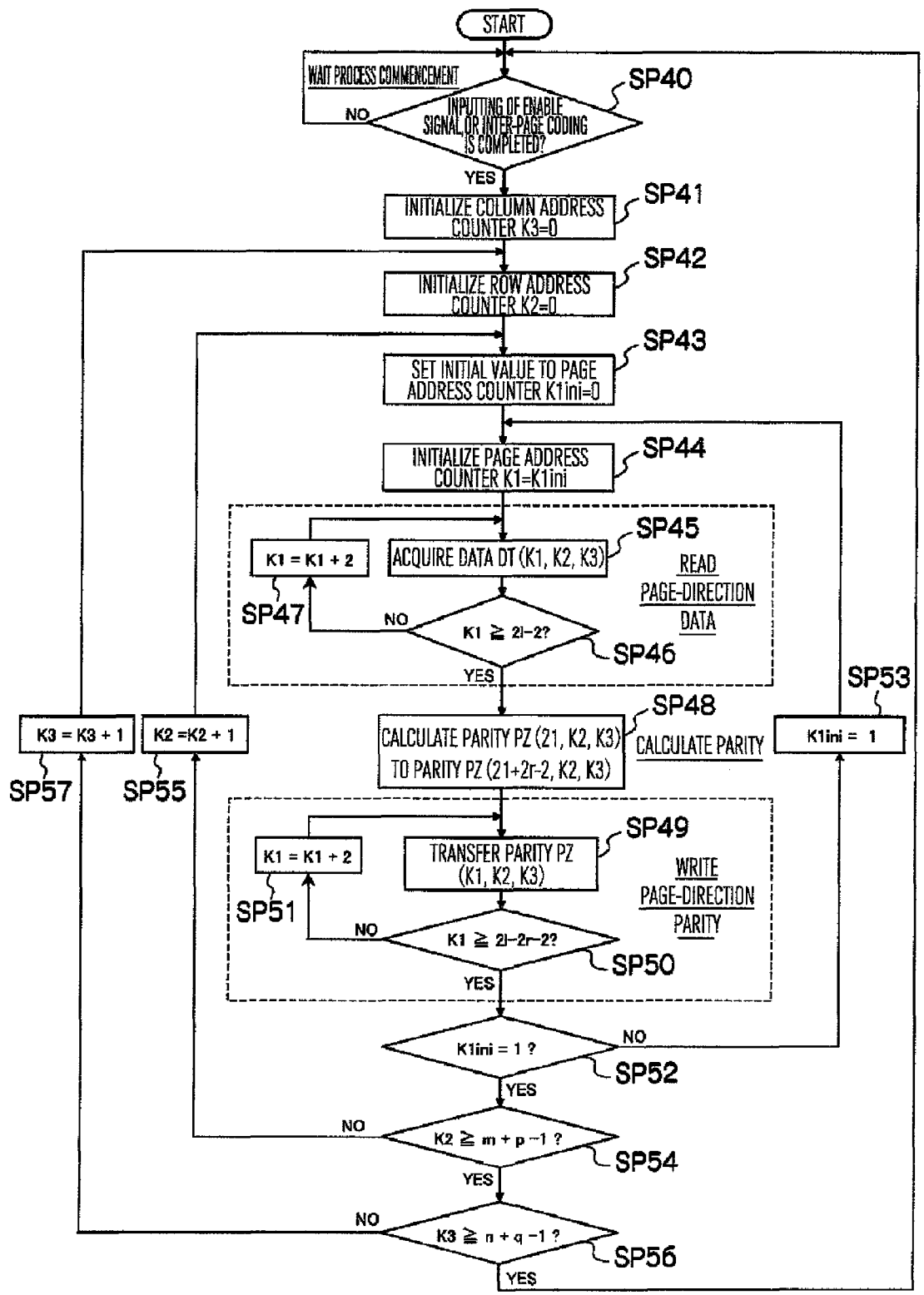
FIG. 16 is a flow chart for describing a series of inter-page coding process flows executed in the inter-page coding circuit.
Figure 17:
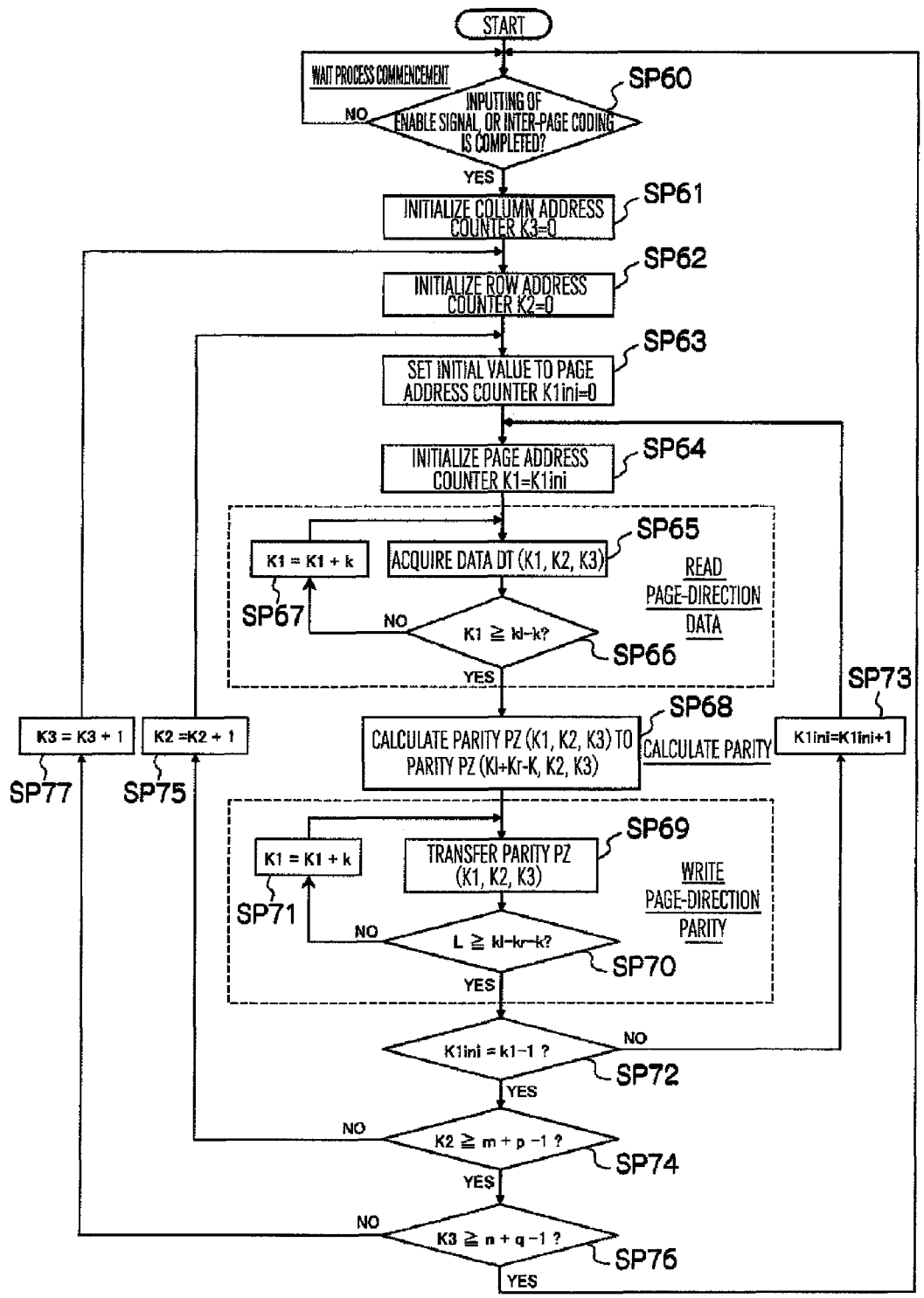
FIG. 17 is a flow chart for explaining a series of inter-page coding process flows according to another embodiment.

The invention claimed is:

1. An optical information recording device for angle-multiplexing data for a plurality of pages to record the angle-multiplexed data on the same recording region of a hologram disk, comprising:

a signal producing unit configured to sequentially divide input data in a predetermined unit so as to sequentially produce data of respective pages, and configured to perform an inter-page coding process by which said plurality of pages to be recorded on said same recording region are divided into a plurality of page groups in order that pages which are recorded adjacent to each other by being angle-multiplexed do not belong to the same page group, and an inter-page error correction code is separately calculated for each of said page groups and the calculated inter-page error correction code is added thereto; and an optical pickup configured to angle-multiplex the data of said plural pages to which said inter-page coding process has been performed so as to record the angle-multiplexed data on said hologram disk.

2. An optical recording device as claimed in claim 1, wherein:

said signal producing unit is configured to divide said plurality of pages to be recorded on said same recording region into said two page groups of even pages and odd pages, and is configured to perform said inter-page coding process for each of said page groups.

3. An optical recording device as claimed in claim 1, wherein:

said signal producing unit is configured to continuously perform said inter-page coding process for each of said page groups as to each row and each column within the page.

4. An optical recording device as claimed in claim 1, wherein:

said signal producing unit is comprised of:

a data input unit configured to sequentially divide the input data in said predetermined unit so as to sequentially produce the data of the respective pages;

an intra-page coding process unit configured to perform an intra-page coding process corresponding to a coding process within a page with respect to the data of each of said pages produced by said data input unit;

an inter-page coding unit configured to divide said plurality of pages to be recorded on the same recording region into said plurality of page groups, to which said intra-coding process has been performed, and configured to separately perform said inter-page coding process for each of said page groups;

a recording pattern producing unit configured to produce a recording pattern of each of said pages based upon the data of each of said pages within each of said groups to which said inter-page coding process has been performed;

a recording pattern transferring unit configured to transfer the recording pattern of each of said pages produced by said recording pattern producing unit to said optical pickup; and a control unit configured to perform a control operation in such a manner that the processes of said intra-page coding unit, said inter-page coding unit, said recording pattern producing unit, and said recording pattern transferring unit do not surpass the process of said data input unit, said intra-page coding unit, said inter-page coding unit, or said recording pattern producing unit.

5. An optical information recording method for angle-multiplexing data for a plurality of pages to record the angle-multiplexed data on the same recording region of a hologram disk, comprising:

a first step of sequentially dividing input data in a predetermined unit so as to sequentially produce data of respective pages, and of performing an inter-page coding process by which said plurality of pages to be recorded on said same recording region are divided into a plurality of page groups in order that pages which are recorded adjacent to each other by being angle-multiplexed do not belong to the same page group, and an inter-page error correction code is separately calculated for each of said page groups and the calculated inter-page error correction code is added thereto; and a second step of angle-multiplexing the data of said plural pages to which said inter-page coding process has been performed so as to record the angle-multiplexed data on said hologram disk.

6. An optical information recording method as claimed in claim 5, wherein:

in said first step, said plurality of pages to be recorded on said same recording region are divided into said two page groups of even pages and odd pages, and said inter-page coding process is performed for each of said page groups.

7. An optical information recording method as claimed in claim 5, wherein:

in said first step, said inter-page coding process for each of said page groups is continuously performed as to each row and each column within the page.

8. An optical information recording method as claimed in claim 5, wherein:

said first step is comprised of:

a data input step of sequentially dividing the input data in said predetermined unit so as to sequentially produce the data of the respective pages;

an intra-page coding process step of performing an intra-page coding process corresponding to a coding process within a page with respect to the data of each of said pages produced by said data input step;

an inter-page coding step of dividing said plurality of pages to be recorded on the same recording region into said plurality of page groups, to which said intra-coding process has been performed, and of performing separately said inter-page coding process for each of said page groups;

a recording pattern producing step of producing a recording pattern of each of said pages based upon the data of each of said pages within each of said groups to which said inter-page coding process has been performed; and a recording pattern transferring step of transferring the recording pattern of each of said pages produced by said recording pattern producing unit to said optical pickup; and wherein:

a control operation is carried out in such a manner that the processes of said intra-page coding step, said inter-page coding step, said recording pattern producing step, and said recording pattern transferring step do not surpass the process of said data input step, said intra-page coding step, said inter-page coding step, or said recording pattern producing step.

* * * * *